United States Patent [19]
Osterholtz

[11] 3,846,521
[45] Nov. 5, 1974

[54] LOW ENERGY ELECTRON BEAM TREATMENT OF POLYMERIC FILMS, AND APPARATUS THEREFORE

[75] Inventor: Fred D. Osterholtz, Warwick, N.Y.

[73] Assignee: Union Carbide Corporation, New York, N.Y.

[22] Filed: Feb. 3, 1971

[21] Appl. No.: 112,125

[52] U.S. Cl................ 264/22, 55/16, 204/159.13, 204/159.14, 204/159.19, 204/159.2, 204/160.1, 250/527, 264/216, 264/320, 264/321, 264/331, 264/340, 264/DIG. 13

[51] Int. Cl....... B29d 7/20, B29d 21/00, C08j 1/02, H01g 37/30

[58] Field of Search....... 264/41, 22, 340, 331, 216, 264/320, 321, DIG. 13; 55/16; 204/168, 159.13, 159.14, 159.19, 159.2, 160.1

[56] References Cited
UNITED STATES PATENTS

| | | | |
|---|---|---|---|
| 2,981,680 | 4/1961 | Binning | 55/16 X |
| 3,022,543 | 2/1962 | Baird et al. | 99/171 LP UX |
| 3,057,792 | 10/1962 | Frohlich | 204/168 X |
| 3,144,399 | 8/1964 | Rainer et al. | 99/171 LP UX |
| 3,223,757 | 12/1965 | Owens et al. | 264/22 |
| 3,239,996 | 3/1966 | Huffman et al. | 55/16 |
| 3,438,504 | 4/1969 | Furman | 264/22 UX |
| 3,616,458 | 10/1971 | Moriya | 204/168 X |
| 3,636,150 | 1/1972 | Rowley et al. | 264/22 X |

FOREIGN PATENTS OR APPLICATIONS

| | | | |
|---|---|---|---|
| 1,083,778 | 9/1967 | Great Britain | 55/16 |
| 1,089,285 | 11/1967 | Great Britain | 264/22 |

OTHER PUBLICATIONS

Little, K., "Irradiation of Linear High Polymers," in Nature, Vol. 120, No. 4338, Dec. 20, 1952, pp. 1075–1076.

Sun, K. H., "Effects of Atomic Radiation on High Polymers," in Modern Plastics, Sept. 1954, pp. 141–144, 146, 148, 150, 229–233, 236–238.

Toms, D., "The Effect of Oxygen on the Changes Produced by Ionizing Radiations in Polymers," in Journal of Polymer Science, Vol. XXII, issue No. 101, (1956) (Letters to the Editors) pp. 343–348.

Adolphe, Chapiro, "Radiation Chemistry of Polymeric Systems," New York, Interscience, 1962, pp. 423–424 (High Polymer Series).

Brubaker, David William and Karl Kammermeyer, "Separation of Gases by Plastic Membranes, Permeation Rates and Extent of Separation," in Industrial and Engineering Chemistry, April 1954, pp. 733–739.

Stern, S. A. and T. F. Sinclair; P. J. Garris; N. P. Vahldieck; P. H. Mohr, "Helium Recovery by Permeation," in Industrial and Engineering Chemistry," Vol. 57, No. 2, February, 1965, pp. 49–60.

*Primary Examiner*—Philip E. Anderson
*Attorney, Agent, or Firm*—William Raymond Moran

[57] ABSTRACT

Polymeric films are exposed to a low energy electron beam in order to alter the permeability characteristics of the polymeric films for gases. The so treated polymeric films have enhanced utility for separating gases such as hydrogen and helium from mixtures containing same.

43 Claims, 7 Drawing Figures

LOW ENERGY ELECTRON BEAM TREATMENT OF POLYMERIC FILMS, AND APPARATUS THEREFORE

The invention relates to a process and apparatus for the treatment of polymeric films with a low energy electron beam, and to the use of the so treated films as permeable membranes for the separation of gases or as barriers for gases.

Although it has been proposed for many years to employ polymeric films as permeable membranes for the separation of gases, such use has not attained substantial commercial importance. A principal reason for this lack of commercial success is that the membranes available have not had sufficient selectivity for the gas desired to be recovered, and/or the rate of diffusion of either the gas desired to be recovered or the other gases in the mixture has been too low, to enable the process to be carried out economically.

It has been proposed to alter the gas permeability properties of certain types of polymeric films to a useful degree by various types of radiation treatment. For instance, Huffman et al., U.S. Pat. No. 3,239,996, disclose the treatment of films made from tetrafluoroethylene, polyethylene, polypropylene, polystyrene, ethyl cellulose, and polyethylene terephthalate, with irradiation by X-rays, gamma rays, beta rays, and particles from a Van de Graaff accelerator. As a result of such treatment, the usefulness of such films for separating helium from natural gas is enhanced.

The tenor of Huffman et al. is that the entire thickness of the film, not just the surface, is altered by the treatment. The Huffman et al. process, carried out within and near the total dosage range disclosed by Huffman et al., has been found not to significantly alter the permeability of certain types of polymeric films.

It has also been proposed to improve the adhesion or printability of various types of polymers by various types of surface treatments. For example, polyethylene film can be subjected to a corona discharge to improve printability (see, for instance, Traver, U.S. Pat. No. 3,018,189). Grasenick, in British Pat. No. 1,083,778, discloses a process for reversibly improving the adhesive properties of poly(tetrafluoroethylene) by subjecting it to treatment with moderately accelerated electrons, such as electrons that have been subjected to an accelerating voltage of 100 to 10,000 volts. The treatment is carried out, for example, under reduced pressure, ". . . suitably at a pressure of $10^{-2}$ m.m. Hg [$10^{-2}$ torr] or less." Grasenick states that the improvement in adhesion is not permanent, and that no chemical alteration of the polymer occurs as a result of the treatment. Other types of surface treatments that have been disclosed for various polymers include spark or spray discharge (Feldman, U.S. Pat. No. 3,222,188), and a direct current diffuse electrical discharge (Wood, U.S. Pat. No. 3,369,982).

The present invention provides a method for altering the gas permeability of polymeric films, in many cases with the result that the separation selectivity (by permeation) for certain gases is substantially increased, while at the same time maintaining relatively high rates of diffusion for certain of the gases, by exposing polymeric film to a low energy electron beam treatment.

Accordingly, it is an object of this invention to provide a process and apparatus for altering the permeability of polymeric films to at least one gas.

An additional object of the invention is to provide treated polymeric film.

Another object of the invention is to provide a method for the separation and/or concentration of gases utilizing polymeric film that has been exposed to a low energy electron beam treatment.

An additional object of the invention is to provide a method whereby the separation selectivity (by permeation) of polymeric film towards at least one gas is substantially increased.

A further object of the invention is to provide a method and apparatus for the low energy electron beam treatment of polymeric films.

A still further object of the invention is to provide polymeric film having a surface layer that has different gas permeation properties than the underlying film.

A still further object of the invention is to provide a method for altering the barrier properties of polymeric films with respect to at least one gas.

These and other objects and advantages of the invention will be apparent from the following description and accompanying drawings, in which.

Figure 1:
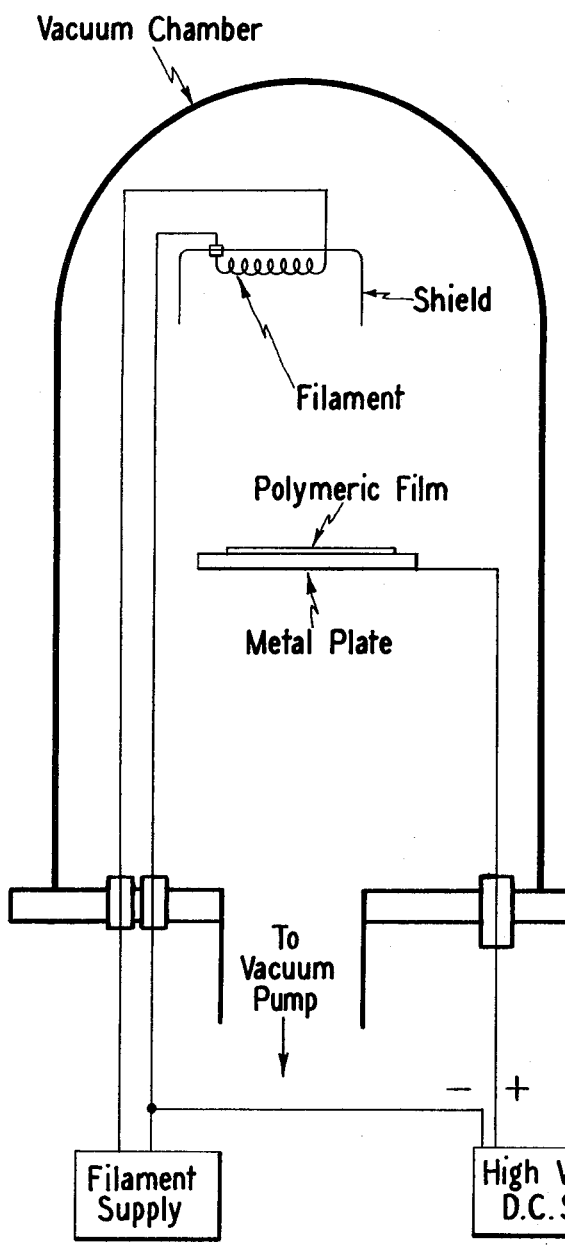
FIG. 1 is a schematic drawing of an apparatus for carrying out the low energy electron beam treatment process of the invention.

The present invention is based upon the discovery that the treatment of polymeric films by a low energy electron beam alters the gas permeability characteristics of the so treated polymeric film. As a result, in many cases, the separation ability and/or barrier properties of such treated polymeric films for certain gases is significantly and substantially altered to a useful degree.

Films prepared from any type of polymer that has the ability to form a film can be employed in the invention. For instance, the invention can be employed to alter the gas permeability characteristics of films of olefin polymers such as ethylene homopolymer, ethylene/vinyl acetate copolymers, ethylene/ethyl acrylate copolymers, poly(4-methylpentene-1), polybutene-1, polypropylene, "ionomers," i.e., salts of, for example, ethylene/acrylic acid copolymers, and the like. Another useful class of polymeric films that can be employed in the invention are the polycarbonate polymers including the bisphenol A polycarbonates, the tetramethylcyclobutanediol (C–4) polycarbonates (both homopolymers and random and block copolymers with, for example, bisphenol A polycarbonates), and the like. Another class of polymers that can be employed in the invention are the cellulosic polymers such as films prepared from cellulose acetate, cyanoethyl cellulose, cellulose acetate-butyrate, ethyl cellulose, and the like. Other polymeric films that can be employed include those prepared from polydimethylsiloxane silicone rubber, silicone-polycarbonate block copolymers such as polydimethylsiloxane/bisphenol A polycarbonate block copolymers, silicone-polysulfone block copolymers, silicone-polycaprolactone block copolymers, and the like. Still further polymeric films that can be employed are those prepared from polyacrylonitriles, polyesters such as polyethylene terephthalate, fluorinated polymers such as polytetrafluoroethylene, poly(-tetrafluoroethylene-hexafluoropropylene), and polyvinyl fluoride, polyamides such as nylon-6 and nylon-6/6, polyvinyl acetate, polybutadienes and other synthetic rubbers, natural rubber, polyphenylene oxides, polyurethanes, polystyrene, polyimides, polysulfone, and the like. The particular polymeric film selected for use in the invention is dictated, in part, by the intended end use for the material. For instance, certain types of polymeric films have extremely high intrinsic permeabilities for gases such as hydrogen and helium, and therefore, such films are preferred for utility in gas permeation processes for separating hydrogen or helium from mixtures containing the same. The polymeric films having high intrinsic permeability for hydrogen and helium include (C–4) polycarbonate, silicones and copolymers thereof, cellulose acetate, PPO$^{TM}$ (a polyphenylene oxide), poly(4-methylpentene-1), "TEFLON FEP," and the like. Films of blends of different polymers can also be used in the invention. One such commercially available blend is a mixture of a polyphenylene oxide and polystyrene. ("Noryl," from General Electric Company). Films containing fillers and other conventional additives can be used in most cases.

Polymeric films of various thicknesses can be treated in accordance with the invention. For utility as permeable membranes in gas separation processes, relatively thin films are preferred in order to achieve maximum rates of permeation through the film. For instance, films of up to 6 mils, and preferably less than about 2 mils, are normally employed in gas permeation process. The asymmetric films having a thin, dense surface layer and a relatively thick porous layer, and which are highly useful in permeation processes, often have thicknesses of about 3½ to 4 mils, and may have total thickness up to about 10 mils. There is no theoretical limit to the thickness of the films that can be treated by the invention. For instance, dense films thicker than about 6 mils may have their gas barrier properties against certain gases significantly enhanced, although the usefulness of such thick dense films in permeation processes is relatively low. The film need not be flat. For instance, capillary tubing can be employed.

The above-exemplified polymeric films are known in the art. Specific illustrative polymeric films that have been found to be useful in the invention, and references describing them, include films of the following polymers:

Asymmetric cellulose acetate films having a relatively thin dense layer and a relatively thick porous supporting layer, as described in Merten et al., U.S. Pat. No. 3,415,038;

Bisphenol alkane polycarbonates, commercially available from the General Electric Company under the trade mark "Lexan"; as described in Robb, U.S. Pat. No. 3,256,675; Schnell, U.S. Pat. Nos. 3,028,365 and 3,062,781; and Fox, U.S. Pat. No. 3,144,432;

"C–4," or 2,2,4,4-tetramethyl-1,3-cyclobutanediol polycarbonate resins, such as, for instance, those disclosed by Schnell, "Chemistry and Physics of Polycarbonates" Inter-science Publishers, New York (1964), especially on pages 16 et seq.; Gawlak et al., pages 1148–1149, "Chemistry and Industry," June 23, 1962; D'Onofrio, in British Pat. No. 1,011,283 and U.S. Pat. No. 3,375,210; I.C.I., British Pat. No. 925,139; and Elam et al., U.S. Pat. No. 3,313,777;

Silicone-polysulfone polymers such as those block evaluated. having at least one polydimethylsiloxane chain and at least one polyarylene polyether chain having recurring units of the formula:

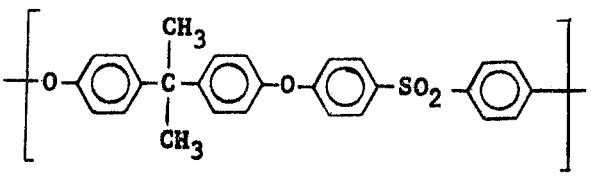

or

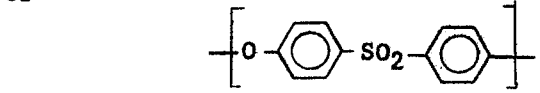

such as those disclosed in Belgian Pat. Nos. 730,159; 730,160 and 730,161 (corresponding to copending U.S. Pat. application Ser. Nos. 714,767; 714,768 and 714,796, assigned to the same assignee as this application and now U.S. Pat. Nos. 3,539,655; 3,539,656 and 3,539,657 respectively);

Polycarbonate-polysiloxane copolymers such as those described in Krauss et al., U.S. Pat. No. 3,379,790; Matzner et al., Belgian Pat. No. 744,527 (corresponding to U.S. Pat. application Ser. No. 792,132, assigned to the same assignee as this application and now Pat. No. 3,579,607); Vaughn, Jr., U.S. Pat. Nos. 3,419,634 and 3,189,662; and Goldberg, U.S. Pat. No. 2,999,845. A commercially available polycarbonate-polysiloxane block copolymer is "MEM-213" (General Electric Company), a 50/50 block copolymer having a polydimethylsiloxane chain and a bisphenol A polycarbonate chain.

As was indicated above, and as is illustrated in the Examples below, there is theoretical basis for the assertion that any type of polymeric film can be subjected to the low energy electron beam treatment of the invention and thereby have said films permeability to at least one gas significantly altered. The film employed is preferably free of mechanical defects, such as crazing, gel specs, blisters, impurities, and the like, which can cause an excessive tendency to form pinholes during the electron beam treatment, in some cases.

Among the important classes of polymeric films that deserve particular mention are films prepared from the following polymers:

Polymers of olefinically unsaturated monomers, including, for instance, polyethylene, ethylene/ethyl acrylate interpolymers, polyvinyl chloride, polytetrafluoroethylene, polybutadiene, salts of ethylene/alkenoic acid interpolymers, and the like;

Cellulosic polymers including regenerated cellulose "Cellophane," cellulose acetate, ethyl cellulose, and the like;

Polycarbonates of bisphenol alkanes and of 2,2,4,4-tetramethyl-1,3-butanediol including 2,2-bisphenolpropane polycarbonate, 2,2,4,4-tetramethyl-1,3-butanediol polycarbonate, 2,2,4,4-tetramethyl-1,3-butanediol/2,2-bisphenolpropane poly-carbonate random and block copolymers, 2,2-bisphenolpropane/-polydimethylsiloxane block copolymers, and the like;

Various hydrophilic, in many cases water-soluble, polymers such as poly(ethylene oxide), poly(vinyl pyrolidone), polyacrylamide, anionic polyacrylamide, poly(vinyl alcohol), maleic anhydride-vinyl ether copolymers, poly(acrylic acid), ethylene-maleic anhydride copolymers, poly(vinyl ether), hydroxypropyl cellulose, methyl cellulose, carboxymethyl cellulose, hydroxyethyl-carboxymethyl cellulose, poly(methacrylic acid), poly(vinylsulfonic acid), polystyrene sulfonic acid, and the like; (the foregoing exemplified hydrophilic polymers are, except for poly(ethylene oxide), either polymers of olefinically unsaturated monomers or cellulosic polymers.)

Siloxane polymers including dimethylsiloxane rubbers and copolymers of siloxanes with polysulfones, polycarbonates, polycaprolactones, and the like.

Asymmetric films are also especially useful in the invention. Asymmetric films can be prepared from many types of polymers including cellulose polymers such as cellulose acetate, polycarbonates, and the like.

The polymeric films that are employed in the invention are exposed to a low energy electron beam treatment. In FIG. 1, a schematic diagram of an apparatus for exposing a polymeric film to a low energy electron beam treatment is shown. In the apparatus shown in FIG. 1, the polymeric film to be treated is placed inside a vacuum chamber on a metal plate.

There is no theoretical lower limit to the vacuum that can be employed. Equipment limitations are such that about $10^{-7}$ torr is the lowest pressure that can practically be maintained. At least part of the reason for this is that most polymeric films will give off gases during the treatment that will raise the pressure. No advantage has thus far been found for operating at pressures below about $10^{-5}$ torr.

The upper limit of pressure is that point at which a glow discharge begins to appear. This pressure will vary somewhat from the high $10^{-4}$ region (i.e., from about 7 to about $10 \times 10^{-4}$ torr) to about $5 \times 10^{-3}$ torr, depending upon factors such as the nature of the gases present and the current and voltage between the source and the target.

The preferred operating pressure is from about $10^{-5}$ torr to the low $10^{-3}$ torr region (i.e., about $3 \times 10^{-3}$ torr).

The source of electron beams in apparatus of FIG. 1 is a filament, which is heated by the filament supply circuit. In the particular apparatus that has been employed, a tungsten filament has been used that can be heated to a temperature of from about 1,200° to about 2,600°C. With other filament materials, somewhat different temperatures would be employed. In the apparatus shown in FIG. 1, the distance between the filament and the polymeric film has varied from about 5 to about 18 centimeters, although distances outside this range can be employed. The distance which can be employed is not narrowly critical, and will depend, in part, upon the electrical potential between the filament and the target. In operation, after the filament supply has been turned on, a DC potential is created between the filament and the metal plate which serves as a platform for the polymeric film. (Alternatively, the potential may be applied first.) The negative side of the DC supply is attached to the filament, and the positive side of the DC supply is attached to the plate holding the polymeric film sample.

The potential between the electron beam source (filament) and the target (in this case, the metal plate holding the polymeric film) can vary over a fairly high range from, for example, 10 volts up to about 30,000 volts. The preferred range of voltage is from about 10 to about 3,000 volts. As was indicated above, the actual voltage selected will depend upon factors such as the distance from the filament to the sample, the tendency of the sample to form pinholes, the time of treatment, the thickness of the polymeric film, and the like.

Either the positive or the negative side of the circuit can be grounded, if desired. For safety and convenience, it is usual to operate with the filament grounded and the target at high positive voltage relative to ground. This permits the use of conventional variable autotransformers (such as "Variac," "Powerstat," and the like) to heat the filament. If the filament is maintained at high negative potential relative to ground, the power supply used to heat the filament must be isolated so that high voltage cannot leak back to the input side of the filament supply, and from there into the power lines. This isolation can be obtained by methods commonly known to those skilled in the art, such as the use of filament transformers with isolated secondary windings, or the use of isolation transformers between the supply and the filament.

Figure 2:
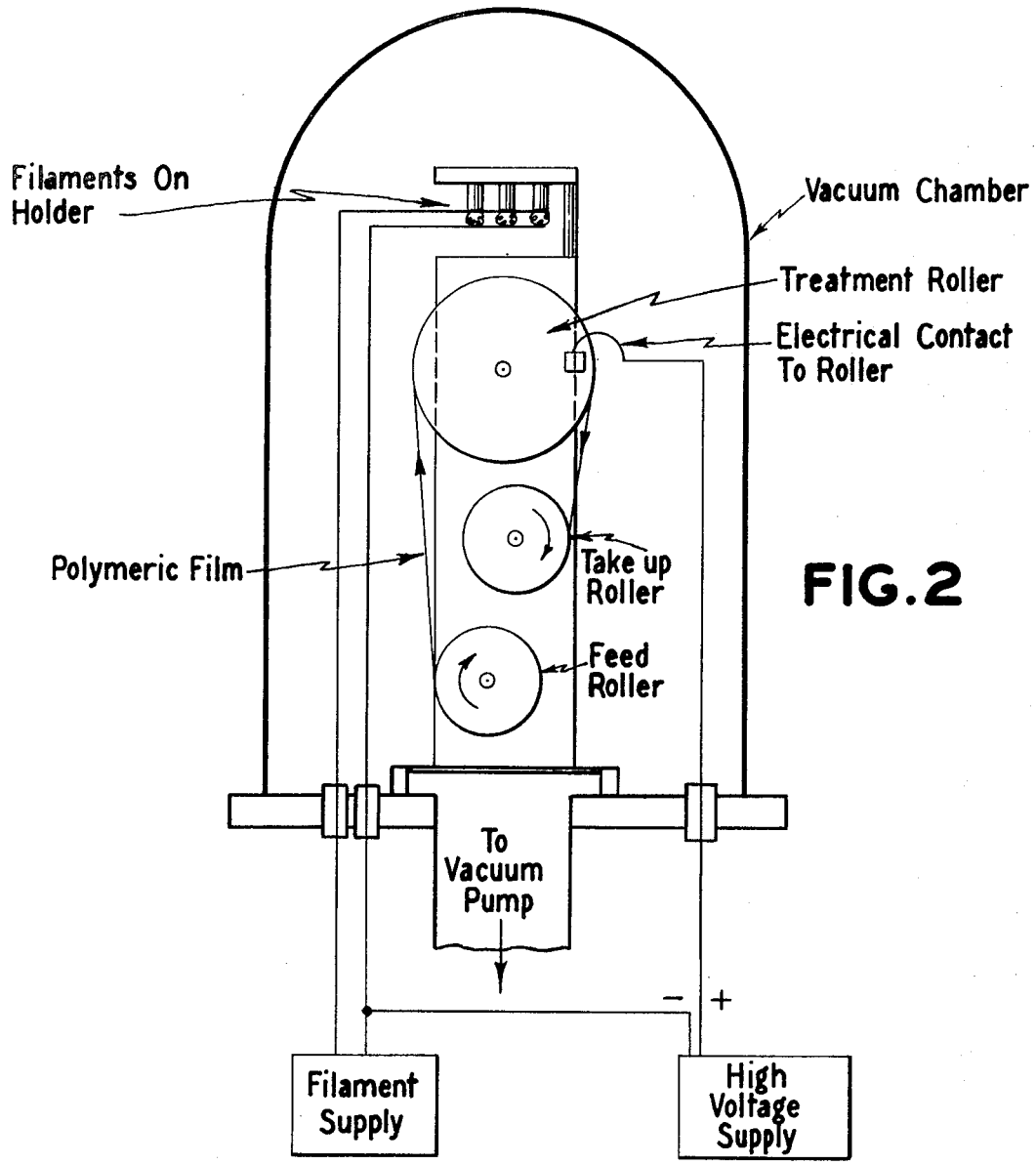
FIG. 2 is a schematic drawing of an alternate apparatus for carrying out the low energy electron beam treatment of the invention, wherein the polymeric film is exposed to the low energy electron beam treatment in a continuous process.

FIG. 2 shows a schematic diagram of an alternate apparatus for carrying out the low energy electron beam treatment of the invention. This apparatus provides for a continuous treatment of the polymeric film. As is shown in FIG. 2, the film to be treated is continuously fed from a feed roll around a metal roller that is electrically connected to the positive side of the high voltage supply. After passing around this roller, the polymeric film is then wound up on takeup roll.

Figure 3:
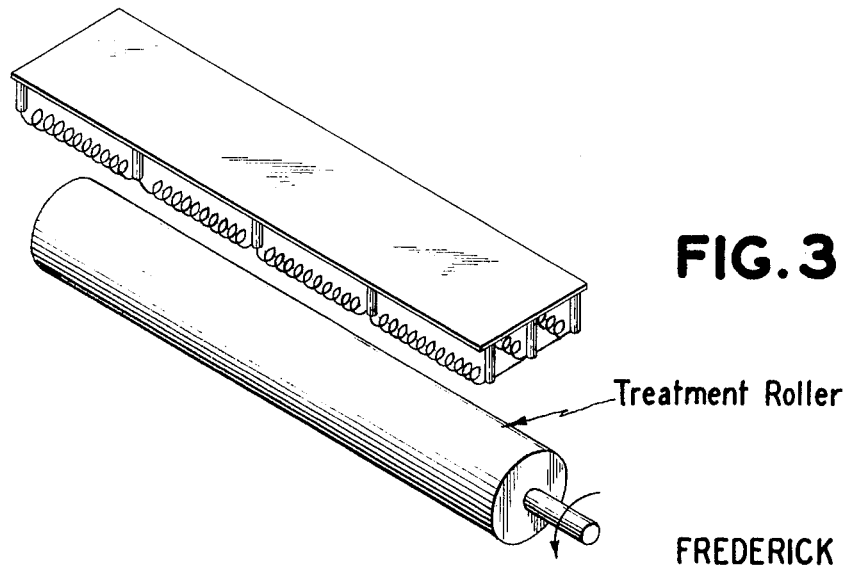
FIG. 3 is a perspective view of the low energy electron beam source and the uppermost roller of FIG. 2.

FIG. 3 shows an enlarged perspective of the uppermost (treatment) roller of FIG. 2 and the filament, which acts as the source of low energy electrons.

Figure 4:
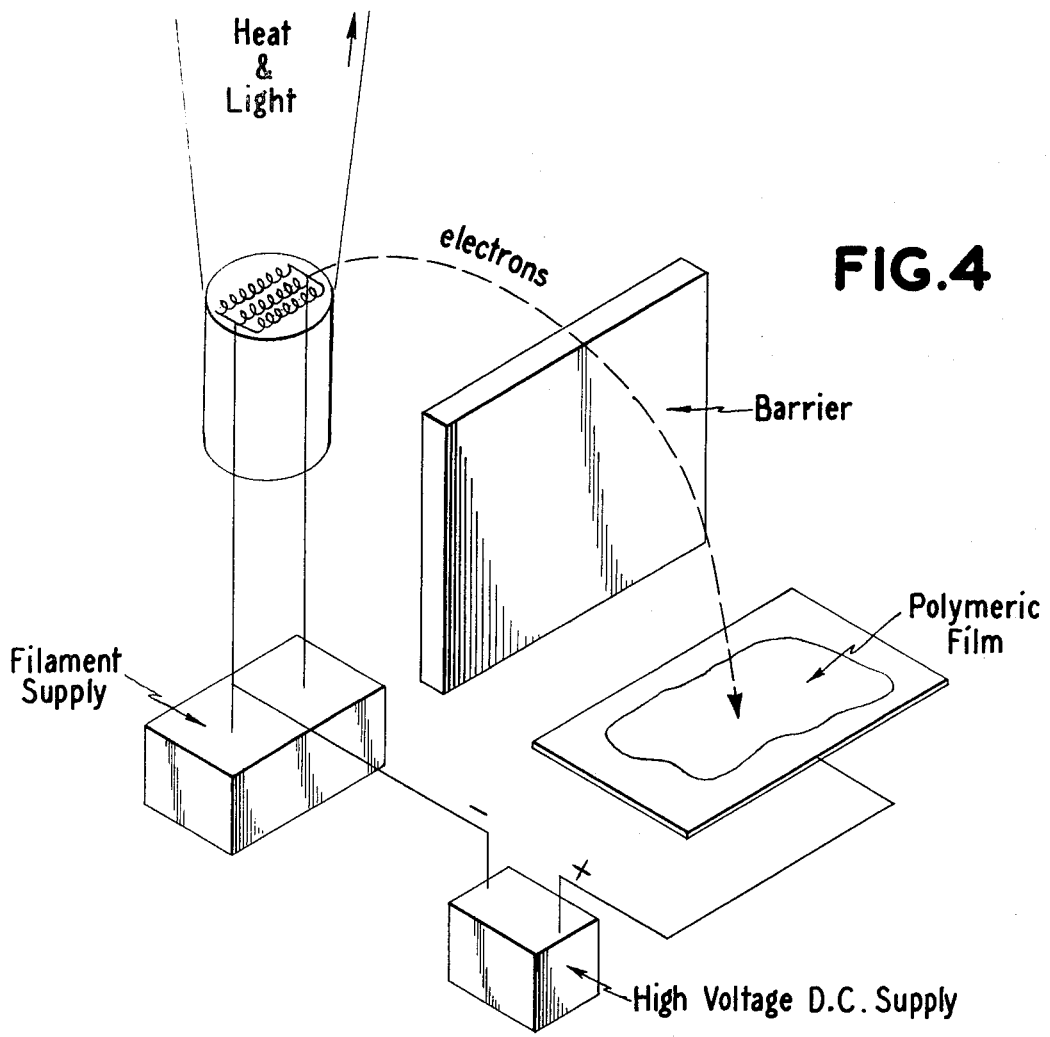
FIG. 4 is a schematic diagram of an apparatus for carrying out the low energy electron beam treatment of the invention wherein an indirect or bent beam of electrons is employed.

FIG. 4 is a schematic of a further alternate embodiment of the apparatus shown in FIG. 1 wherein the electron beam employed is bent around a barrier from the source of electrons to the polymeric film sample to be treated. An indirect or bent electron beam treatment can be carried out with less radiant heating of the film, and without bombarding the film with light.

If desired, other types of electrical potential can be used to impell electrons to the surface of the film. Alternative circuit arrangements can include those shown in FIGS. 5 and 6. Those skilled in the art of designing electron emitting devices to be used, for example, in vacuum tubes or in electron accelerators, will recognize that other variations in circuitry will accomplish the intent of this invention. That is, such variations will emit low energy electrons and impel them toward the surface of the sample. Other types of electron emitters may be used, including, but not limited to, those described in the book "Vacuum Tubes" by Carl R. Spangenberg, McGraw-Hill Book Company, New York, 1948, and that shown by E. C. Muly, Jr., et al., in U.S. Pat. No. 3,516,920; and in U.S. Pat. No. 3,530,057.

Figure 5:
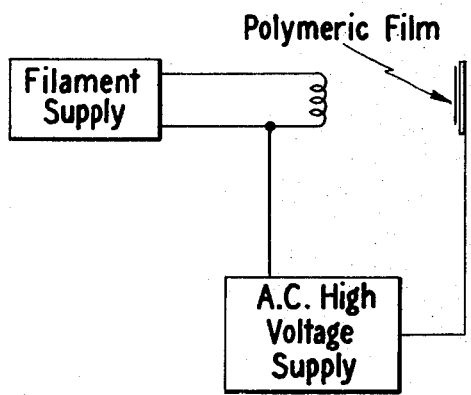
FIG. 5 is a schematic diagram of an alternate electrical circuit for carrying out the low energy electron beam treatment of the invention.

Referring now to FIG. 5, either side of the high voltage supply may be grounded, if desired, for safety or convenience, provided suitable precautions are taken to isolate the filament supply. In the circuitry shown in FIG. 5, an alternating current potential is employed between the source of electrons and the target.

Figure 6:
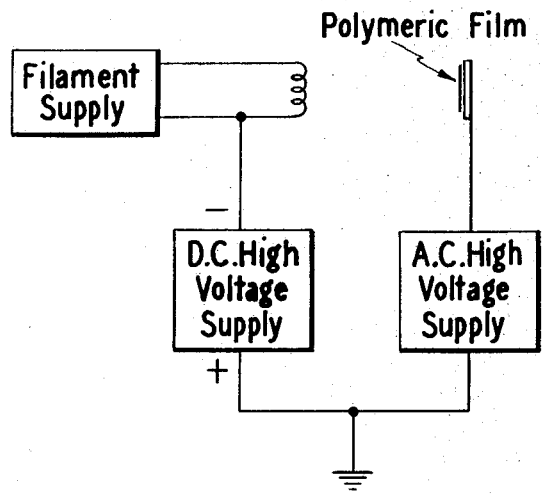
FIG. 6 is a schematic diagram of another alternate electrical circuit for carrying out the low energy electron beam treatment of the invention.

In FIG. 6, the electrical circuitry employed includes both a direct current and an alternating current potential between the electron beam source and the target holding the polymeric film sample to be treated. Although FIG. 6 shows a specific grounding arrangement chosen as convenient for our experiments because of equipment limitations, other grounding arrangements or arrangements of the circuit elements could be employed.

In the circuit arrangement of FIG. 5, wherein an alternating current potential between the electron source and the polymeric film target is employed, good results have been obtained at alternating current frequencies of from 60 Hz. to 50 kHz (the limit of the apparatus that was employed). Theoretically, limits would be based on apparatus, not process, although at higher voltages there would be an advantage to employing higher frequencies, even up to, for example, 13.6 megahertz. Voltages that have been employed successfully in the circuit arrangement shown in FIG. 5 have been from about 125 to 1,100 volts. The 1,100 volts were the limit of our equipment. Higher voltages, for example, up to 3,000 volts and more, can be employed.

In the circuit arrangement of FIG. 6, using a combination of AC and DC, and with the apparatus of FIG. 1 using a 4½ inch distance from filament to polymeric film sample to be treated, we have customarily employed a direct current voltage of 2,200 volts, and an alternating current voltage of 1,000 volts at 50,000 cycles. Of course, voltages and frequencies outside this range can be employed.

In the apparatus of FIG. 1, using the circuits of FIGS. 1, 5, or 6, polymeric films have been exposed to currents up to 21 mA at a distance of about 4½ inches (about 10.43 centimeters). The most directly exposed area is approximately 40 square centimeters. The maximum exposures employed in terms of volt-ampere-seconds per square centimeter has been about 1500. This has been more than is necessary to achieve useful treatment of all polymers discussed below in the examples. It is possible that some types of polymers will require more treatment than this. Most polymers tried have shown significant alteration of gas permeability at exposures less than one half this value. The maximum exposure needed in most cases will be not more than about 1000 volt-ampere-seconds per square centimeter.

The minimum exposure that has thus far been found to clearly and significantly alter the permeability of a dense* polymeric film has been about 2.64 volt-ampere-seconds per square centimeter (Example 11, below, Table IX, Sample No. 28). Indeed, a slight increase in helium/methane separation factor may have occurred with Sample No. 27 in the same Table IX. The exposure for this sample (the lowest tried with a dense film) establishes a useful lower limit of about 0.88 volt-ampere-seconds per square centimeter for alteration of the permeability of bisphenol A polycarbonate film. Other dense polymeric films may show useful permeability changes at even lower exposures, for instance, as low as about 0.05 volt-ampere-seconds per square centimeter, especially if further variation in voltage, exposure rate, pressure, and the like, within the teachings of this invention, are attempted.

*As is known in the art, an "asymmetric film, as opposed to a "dense" film has a very thin dense surface layer on a spongy or porous substrate. Thus, an asymmetric film is a dual layer membrane having one porous layer and one non-porous layer, the nonporous layer being substantially thinner than the porous layer.

The lowest exposure for an asymmetric* film reported herein was about 0.64 volt-ampere-seconds per square centimeter (Example 5, below, Table I, on pass). A significant alteration in permeability was obtained. In other experiments with asymmetric films of cellulose acetate, useful changes in permeability were obtained at exposure doses of about 0.064 volt-ampere-seconds per square centimeter. With variations in polymeric film, voltage, exposure dose rate, pressure, and the like, as taught herein, exposure doses as low as 0.005 volt-ampere-seconds per square centimeter, or even lower, can be expected to produce useful changes in permeability in the asymmetric films so treated in some cases.

In experiments that have been carried out using the apparatus of FIG. 1 or FIG. 2, a range of exposure dose rates has been used. Exposure dose rates may be expressed as volt-amperes per square centimeter or milliamperes per square centimeter. In terms of volt-amperes per square centimeter, exposure dose rates from about 0.0015 to about 0.8 have been used successfully. Useful results can be expected to occur at exposure dose rates from about 0.0002 to about 3 volt-amperes per square centimeter as other experimental parameters are varied as taught herein. Extremely high exposure dose rates (as much as hundreds of volt-amperes per square centimeter or more) can be expected to be useful if further variations in experimental conditions (such as voltage, pressure, exposure time, and including the use of pulsed sources and cooled film supports) are used. In terms of milliamperes per square centimeter, exposure dose rates ranging from about 0.007, and lower, to about 2 have been used successfully. Still lower rates, as low as 0.0005 can be expected to produce significant results in some cases. Exposure dose rates up to 20 mA per square centimeter can be expected to produce useful results. As further variation in other factors as taught herein, including voltage, pressure, total exposure dose, and including the use of pulsed sources and cooled film supports is undertaken, exposure dose rates of hundreds of milliamps per square centimeter can be expected to produce useful results in some cases.

As used in the specification and claims herein, exposure doses are given in units of mA seconds and volt ampere-seconds. In all cases, milliamp seconds were calculated by multiplying mA emission (read on a DC milliammeter or microammeter) by time of exposure in seconds. For DC circuits (FIG. 1) or AC plus DC circuits (FIG. 6) when DC voltage was greater than AC voltage, volt amp seconds were obtained from the produce of DC kilovolts times mA emission times time in seconds. For AC only circuits, one half of the product of AC voltage times mA seconds was used to give volt amp seconds, because the circuit was assumed to be a half wave rectifier. The AC voltage was read on an RMS reading voltmeter. No attempt was made in any case to correct for AC power factor or phase angle.

These techniques were also used to calculate exposure rates in terms of milliamperes and volt amperes. All values were corrected to an area basis by dividing the exposure or exposure rate so obtained by the area directly affected, as discussed below. Although it is realized that some error may result from these assumptions and calculations, especially when AC is involved, they provide an operational definition of exposure dose and rate.

In the experiments that have been carried out using the apparatus of FIG. 1, the lowest current that has been successfully employed has been 0.2 mA. The treatment times have varied from 25 to 2400 seconds. With the apparatus of FIG. 2, the treatment time per pass at the fastest speed tried was 1.5 seconds. Currents of up to about 45 mA have been used with the apparatus of FIG. 2.

In experiments with a variety of polymeric films, it has been learned that different materials require different degrees of treatment to produce measurable changes in their permeability and/or measurable changes in their ability to separate gases. The data presented below in the examples, for instance in Tables I through XVIII, are illustrative of successful conditions. In all of these experiments (unless otherwise indicated) the apparatus of FIG. 1 was employed, with the filament and shield being the "Head" from an MRC V4-203 internal electron bakeout gun (available from MRC, Inc. Orangeburg, New York). At a filament to sample distance of approximately 10.4 centimeters (4.5 inches), a circle of approximately 7 centimeters in diameter is intensively treated, about 40 square centimeters).*

*Unless otherwise indicated, when the head from the MRC gun was used as the source of electrons, the filament to sample distance was 4.5 inches. This circle is clearly defined in certain polymers such as polybutene-1 and nylon, because of discoloration which accompanies the treatment. The circle is poorly defined for many other polymers. The discoloration gradually fades as radial distance from the point directly below the filament increases. In addition, some slight treatment was observed on films within 10 to 20 centimeters of the treatment zone. Even within the 7 centimeter circle, there was probably some non-uniformity of treatment. Another factor affecting the uniformity of current density or power density per unit area is that it is not readily apparent to what extent the accumulation of charges (either + or − ) on the sample surface and in the apparatus or the presence of gaseous ions affect the current flow patterns. Thus, the current flow in the experiments utilizing the apparatus of FIG. 1 with the MRC gun maintained at a distance of 4.5 inches may be converted to current per square centimeter by dividing by 40, with the qualification that the result may be accurate only to within plus or minus 50 percent. When the MRC gun is held 2 inches from the polymeric film to be treated, the size of the treatment zone is about 11 square centimeters. At a distance of 7 inches, the size of the treatment zone is about 80 square centimeters. This discussion with respect to the accuracy and size of the treatment zone is appropriate only to the above described electron beam source (i.e., the Head from the MRC V4-203 internal electron bakeout gun). Thus, when the apparatus of FIG. 2 was employed, wherein a source of electrons having a different geometry was employed, treatment over the whole surface of a strip of polymeric material 35 centimeters by about 3 to 4 centimeters was effected.

In the Examples below, all of the low energy electron beam treatments were carried out at ambient temperatures. Some heating of the film is encountered in many cases. Film temperature has not been found to be a critical feature of the invention.

The invention also provides a method for separating gases by utilizing the low energy electron beam treated polymeric film of the invention. The use of permeable membranes for separating gases is known. For instance, reference is made to Merten et al., U.S. Pat. No. 3,415,038; Robb, U.S. Pat. No. 3,256,675; Derosset, U.S. Pat. No. 2,958,391; Robb et al., U.S. Pat. No. 3,335,545; and Stern et al., U.S. Pat. No. 3,246,449. In the present invention, the low energy electron beam treated polymeric films are employed as the permeable membranes. Thus, the invention broadly provides a process for the alteration of the composition of a first mixture of gases wherein the first mixture of gases is brought into contact with one side of a permeable membrane and a difference in partial pressure for specific gaseous components of said first mixture is maintained between said one side and the opposite side of said membrane, wherein the specific gaseous components of said first mixture permeate through said membrane to produce a second gas mixture on the opposite side altered from the composition of the first gas mixture, wherein the membrane comprises the low energy electron beam treated polymeric film of the invention. In a typical embodiment of the process of the invention, a first gas mixture including a first gas and second gases is contacted with the permeable membrane under pressure to cause at least a portion of the first gas mixture to permeate through the membrane to produce a second gas mixture having a higher concentration of the first gas than does the first gas mixture. In an alternative embodiment of this process of the invention, the membrane acts as a barrier to a selected gas so that the second gas mixture has a lower concentration of the selected gas than does the first gas mixture.

In the examples below, the use of the permeation process of the invention to separate many different mixtures of gases is illustrated. Among the more important gases that can be recovered and/or concentrated by the process of the invention, and the mixture of gases in which they can be encountered, the following are significant illustrations:

helium from natural gas (which is often predominantly methane plus other lower hydrocarbons);

carbon dioxide, methane, or hydrogen sulfide from any mixture containing two or three of them; hydrogen from mixtures of hydrogen and carbon monoxide, methane, acetylene, and/or other gaseous hydrocarbons;

oxygen from air;

deuterium from mixtures of hydrogen and deuterium;

methane from mixtures of methane and other light hydrocarbons;

neon from mixtures of helium and neon;

helium from mixtures of helium and nitrogen, oxygen, or argon;

and the like. Of course, many other gases, as well as the foregoing exemplified gases from different mixtures from those enumerated, can be recovered and/or concentrated by the permeation process of the invention.

In the examples below, the gas permeabilities of the various films tested were measured at room temperature by known procedures. The results of the experiments set forth herein demonstrate that the electron beam treatment of the invention definitely alters the permeability constants of the films treated. It is to be understood, however, that variations in temperature, crystallinity of the film, film thickness, and other factors may affect the permeability. Such variances are usually of a minor nature, and do not alter the basic differences and/or changes in permeabilities set forth.

Permeability constants of polymeric films were determined by a procedure and apparatus similar to that described by Brubaker and Kammermayer, Analytical Chemistry, 25, 424–426 (1953). Measurements were made with single gases, and flow rates measured by liquid displacement in a graduated capillary tube with its outlet at ambient atmospheric pressure. All measurements were taken at room temperature; however, the treated membranes can be operated at higher or lower temperatures.

As is known in the art, the permeability constant (P) is usually expressed as:

cm.$^3$ (STP) cm. (film thickness)/sec. cm$^2$ cm. Hg $\Delta$ P

The permeability constant of a membrane for a particular gas, for instance helium, is expressed as "$P_{He}$." The separation factor, "$\alpha$," for a pair of gases refers to the ratio of the permeability constant for one gas of the pair of the permeability constant for the other gas of the pair.

The Examples below illustrate various aspects of the invention.

EXAMPLE 1

Treatment of bisphenol A polycarbonate film

The apparatus represented in FIG. 1 was used. The metal plate holding the sample was a one-fourth inch thick aluminum disk eight inches in diameter. Up to four samples could be installed on this plate. The electron source filament and shield were an MRC model V4–203 Internal Electron Bakeout Gun, suspended from a plastic (insulating) block at a position such that there was a filament to sample distance of 4½ inches. The power supply used to heat the filament was constructed of filament transformers (TRIAD Company model F–10U) with 10,000 volts isolation on the secondary. A conventional autotransformer (VARIAC or POWERSTAT) supplied current to the filament transformers. The high voltage (accelerating voltage) was supplied by a Bendix Vacuum 5 kV variable voltage DC supply (Model SDC-100). The shield is at the same potential as one end of the filament. When A.C. was used, it was supplied by an audio frequency oscillator, an audio amplifier, and a transformer. The AC voltage was measured by an RMS reading meter.

The experiment proceeded as follows:

A 1 mil thick film of Lexan$^{TM}$ was fastened on the top surface of the plate with tape. Lexan$^{TM}$ is a commercially available bisphenol A polycarbonate of film forming molecular weight made by General Electric Company. The film was usually 3½ inches by 4 inches, although samples as small as 3 inches by 3 inches were used. The apparatus was then covered by a bell jar, which was evacuated to a pressure in the $10^{-5}$ torr region. Pressure was measured by a Varian Vacuum Division Millitorr ionization gauge.

The filament was heated by passing through it a current sufficient to cause it to glow yellow to white hot. In this specific case, 3 volts were applied to the filament, causing a current flow of approximately 5.5 amperes, and heating the filament to approximately 1,500°C. as measured by an optical pyrometer. In other experiments, temperatures ranging from about 1,400°C. to 2,100°C. have been used.

In this particular experiment, the circuit arrangement of FIG. 6 was used. Before heating the filament, the accelerating voltage was applied. In this case, the filament and shield were raised to 2.2 kV DC negative. Also, 1.0 kV 50 kHz AC potential was applied to the plate holding the sample. The filament may be heated first or the acclerating voltage applied first, whichever is most convenient. The current through the filament was adjusted to give 5 mA D.C. emission, as measured by a meter in the filament side of the circuit. Other circuit arrangements for DC only or AC only are shown in FIGS. 1 and 5, respectively.

When the filament is first heated and accelerating voltage first applied, degassing occurs from various surfaces in the bell jar including the film sample. The pressure rises into the $10^{-4}$ torr region, then drops. In this particular experiment, the treatment was carried out in the middle of the $10^{-5}$ region (about 3 to 7 × $10^{-5}$ torr). The emission current often decreases during the first few seconds of an experiment. Also, if the accelerating voltage is set first, then the filament is heated, the accelerating voltage often decreases from the preset value. In these experiments, the current through the filament and the applied voltage were adjusted as necessary to maintain the values set forth herein. In this particular experiment, the sample was exposed to 5 mA emission for 800 seconds. The bell jar was filled with air after the filament and accelerating voltages were turned off.

After treatment, the Lexan$^{TM}$ film showed the following permeability constants:

$P_{He} = 1280 \times 10^{-12}$ $P_{CH_4} =$ less than $2 \times 10^{-12}$ ratio $P_{He}/P_{CH_4} = \alpha He/CH_4$
= greater than 640.

In all cases permeability constants are based on the total thickness of the starting film to provide a convenient comparison. The actual thickness of the modified portion of the film was not known in most cases. The real change in P in the modified portion is, of course, greater than the measured changes in P since the measurement is taken across the entire film thickness, which includes the unmodified portion of the film as well as the relatively thin modified part. U treated samples showed:

$P_{He} = 1200$ to $1550 \times 10^{-12}$ $P_{CH_4} = 33$ to $45 \times 10^{-12}$ $\alpha He/CH_4 = 33$ to $46$

EXAMPLE 2

An additional sample of Lexan$^{TM}$ was exposed on the plate, using the same experimental arrangement and procedure described in Example 1.

Conditions used
  Emission current—15–20 mA
  Applied D.C. voltage—2.1kV to 3.4kV
  Applied AC voltage—1.0 kV, 50 kHz
  Circuit — FIG. 6
  Treatment time—200 sec
  Pressure—$10^{-5}$ torr region As the experiment progressed, the accelerating voltage was raised in an attempt to keep the emission at its original value of 20 mA.

| After treatment the sample showed | Another evaluation of same sample |
|---|---|
| $P_{He} = 800 \times 10^{-12}$ | $P_{He} = 1000 \times 10^{-12}$ |
| $P_{CH} = <4 \times 10^{-12}$ | $P_{CH} = 0.63 \times 10^{-12}$ |
| $\alpha He/CH_4 = >200$ | $He/CH_4 = 1590$ |

Thus the separation factor improves by at least five fold with only a slight loss in the permeation rate for helium. This experiment illustrates that relatively shorter exposure times can be used if the emission current is increased.

EXAMPLE 3

Figure 7:
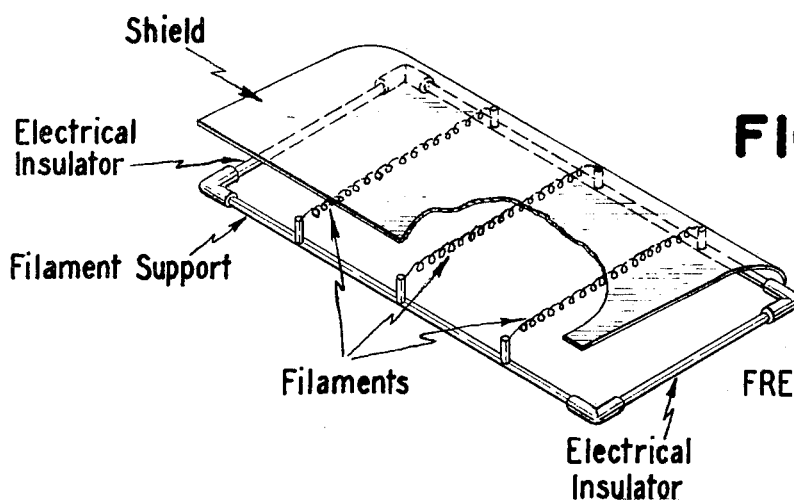
FIG. 7 shows an alternate apparatus that can be used as the source of low energy electron beams.

An additional sample of Lexan$^{TM}$ was exposed to low energy electrons by the procedure of Example 1. The experiment was performed in the same manner described in Example 1, except that a simple home-made filament assembly replaced the MRC electron gun. The home-made assembly is shown in FIG. 7. The electron emitting portion was made from 3 tungsten wires, 10 mil diameter, each 3 inches long, arranged in a parallel circuit.

Conditions Used
  Filament Emission—10mA
  Applied DC voltages—2.2 kV
  Applied AC voltage—1kV 50,000 Hertz
  Treatment time—1,000 sec.
  Sample Characteristics:
    After treatment $P_{He} = 1040 \times 10^{-12}$, $P_{CH_4} = < 4 \times 10^{-12}$ $\alpha$ (separation factor) = > 250

This experiment shows that alternative inexpensive electron sources can be used successfully.

EXAMPLE 4

An additional sample of Lexan$^{TM}$ was exposed on the plate described in Example 1. In this case, the electron source was the MRC electron gun, but the gun was pointed away from the sample. The experimental arrangement of FIG. 4 was used. One side of the filament was grounded. The sample plate was at high positive DC potential.

Conditions for Example 4
  Emission — 7 mA
  Voltage — 2.0 kV DC, no AC
  Time — 800 sec
  Pressure — $10^{-5}$ torr region
  After treatment the sample showed:
    $P_{He} = 1440 \times 10^{-12}$, $P_{CH_4}$ = less than $2 \times 10^{-12}$
    $\alpha He/CH_4$ = greater than 720.

This experiment illustrated that the heat and light radiated by the filament are not a necessary part of the treatment.

EXAMPLE 5

An asymmetric cellulose acetate (C.A.) membrane, prepared from Eastman Kodak type RO-89 desalination membrane by the dehydration process of U.S. Pat. application Ser. No. 7450, filed Sept. 22, 1970, "Preparation of Permselective Membranes," Lawrence M. Litz (assigned to the same assignee as this application), was installed on the roller apparatus shown in FIG. 2. (A brief description of Dr. Litz' dehydration process for C.A. is set forth at the end of this Example.) After evacuation of the chamber, the sample was rolled past the heated filament to help out-gas the strip of C.A. Then the chamber was pumped on overnight to further out-gas the sample. The treatment roller (top roll) is 15 inches wide. The filaments are three coiled 10-mil diam., 2 foot long tungsten wires, suspended three inches above the film strip as it passes over the treatment roller. The filaments were heated by passing through them 5 amperes of 60 Hz A.C. The experiment was carried out in the low $10^{-4}$ pressure region, with 30 mA emission from the filament. The filament was grounded at one end; the roller was maintained at plus 0.6 kV D.C. No AC was used. The linear speed of the film was 2.7 seconds per inch (22 inches per min). The exposure time in the electron beam is approximately 4 seconds per pass. The results are shown in Table I.

Table I

| Treatment | $P \times 10^{12}$ | | $P_{He}/P_{CH}$ |
|---|---|---|---|
| | $P_{He}$ | $P_{CH}$ | |
| none | 7600 | 320 | 24 |
| vacuum only | 5600 | 120 | 47 |
| one pass | 1920 | 8 | 240 |
| two passes | 1600 | 6.4 | 250 |

Treatment of Asymmetric CA Membrane

P is calculated on the basis of the thickness of the dense layer of the membrane (0.25 micrometers, 0.01 mil) as stated by Eastman Kodak.

It is apparent that exposure to vacuum alone produces an important change in the permeation characteristics of this particular type of membrane. It is not understood why this occurs, but a possible explanation would be that the exposure to vacuum removes traces of water and solvents in the membrane surface. This would alter the morphology, hydrogen bonding, crystallinity and other physical characteristics of the material. In other experiments, it has been observed that heating the surface of such an asymmetric cellulose acetate membrane in vacuum may raise or lower the helium separation factor and also may raise or lower the helium permeability constant somewhat.

It is also apparent that the results in Table I show a further striking increase in helium/methane separation factor with electron beam treatment. Although significant reduction in helium flux occurs, a greater percentage reduction in methane flux occurs, so that the resulting material is still extremely useful, and has a relatively high helium flux.

The process described in the foresaid copending U.S. Pat. application Ser. No. 7450, filed Sept. 22, 1970 for preparing asymmetric cellulose acetate films or membranes broadly comprises the following:

The water-containing, dual layer, cellulose acetate membrane is first soaked in a hydrophilic liquid which does not substantially dissolve or swell the membrane, for a time adequate to displace the water in the membrane with the hydrophilic liquid. Typical soaking times are from one-half hour to 16 or 24 hours, or more. Typical hydrophilic liquids are $C_1$ to $C_3$ alkanols, and mixtures thereof. Thereafter, the membrane containing the hydrophilic liquid is soaked in a hydrophobic liquid aliphatic hydrocarbon, which does not substantially dissolve or swell the membrane, for a time adequate to displace the hydrophilic liquid in the membrane with the aliphatic hydrocarbon, and thereafter removing the aliphatic hydrocarbon from the membrane to dry it. Typical soaking times in the aliphatic liquid will vary from one-fourth hour, or less, to several hours, such as 16 hours, or more. Typical aliphatic liquid hydrocarbons are those having from 5 to 16 carbon atoms. Heptane is preferred. The removal of the aliphatic liquid can be carried out by conventional procedures such as by air drying at or slightly above room temperature in a low humidity environment.

EXAMPLE 6

Films of various polymers were exposed to low energy electron beam treatments of varying degrees. The apparatus of FIG. 1 and electrical circuitry of FIG. 6 were employed (the procedures were analogous to that described in Example 1).

After treatment, the films were tested for helium and for methane permeability. Tables II and III below identify the polymeric films tested, the conditions of treatment, the helium and methane permeabilities, and α(the separation factor) for helium/methane. The AC potential employed in each treatment sample was 1,000V at 50 kHz, and the D.C. potential was 2.2kV, unless otherwise indicated. The filament to sample distance was 4½ inches.

Example 7

Employing the apparatus of FIG. 1 and the circuitry of FIG. 6, a series of 2,2,4,4-tetramethyl-1,3-cyclobutanediol polycarbonate (C-4) films were subjected to low energy electron beam treatment by a procedure analogous to that described in Example 1. The permeabilities of the films after treatment were measured for various gases. Tables IV, V, and VI, below, display the condition of treatment, the permeabilities after treatment, and the separation factors with respect to certain pairs of gases. Table IV also displays the per- Table II Treatment of Ethylene-Vinyl Acetate Copolymer Film[1]

| Sample | C.S.T.[2] Dynes/cm | Electron Beam Treatment | $P_{He} \times 10^{12}$ | $P_{CH} \times 10^{12}$ | $P_{He}/P_{CH}$ |
|---|---|---|---|---|---|
| 1 | 33 | None (control) | 760 | 300 | 2.5 |
| 2 | 50 | 1000 seconds 5 mA | 1200 | 16 | 75 |
| 3 | 44 | 500 seconds 5 mA | 880 | 16 | 55 |
| 4 | 56 | 500 seconds 10 mA, 2.1 kV DC | 800 | 8 | 100 |
| 5 | 46 | 400 seconds 8 mA, 2.1 kV DC | 800 | 28 | 28 |

[1] 2-mil film, about 3.5 weight percent vinyl acetate, melt index — 0.6 to 0.9.
[2] Critical surface tension by ASTM D2578-67 — a measure of extent of treatment.

Table III

Treatment of Ethylene Homopolymer Film[1]

| Sample | C.S.T. Dynes/cm | Electron Beam Treatment | $P_{He} \times 10^{12}$ | $P_{CH} \times 10^{12}$ | $P_{He}/P_{CH}$ |
|---|---|---|---|---|---|
| 1 (4 samples) | 32 | None (control) | 450–555 | 140–242 | 2.3–3.2 |
| 2 | 46 | 30 seconds 4 mA | 720 | 258 | 2.8 |
| 3 | 54 | 200 seconds 4 mA | 660 | 96 | 6.9 |
| 4 | 61–63 | 400 seconds 4 mA | 560 | 67 | 8.5 |
| 5 | 50* (Three Samples) | 800 seconds 4 mA | 600–720 | <4–12 | 50–180 |
| 6 | 61 | 800 seconds 4 mA | 840 | 12 | 70 |

*Checked nine days later
[1] 3-mil film, biaxially oriented, density — 0.921 to 0.923, and Melt Index — 0.6 to 0.9

TABLE IV 1.0 mil C-4 Polycarbonate Film; Treatment—400 seconds at 2.2 kV DC, 1 kV and 50 kHz AC, 4.2 to 4.8mA, at a pressure in the $10^{-5}$ torr region.

| Gas | Permeability Constant × $10^{12}$ or separation factor | | | | | |
|---|---|---|---|---|---|---|
| | Untreated Film No. 1 | Untreated Film No. 2 | Untreated Film No. 3 | Untreated Film No. 4 | Untreated Film No. 5 | After Treatment |
| He | 4480 | 4000 | 4780 | 5510 | 4250 | 3640 |
| $CH_4$ | 224 | | | 216 | 182 | 4.7 |
| $CO_2$ | | | 4620 | 4000 | | 136 |
| $O_2$ | | | 635 | | | 58 |
| $N_2$ | | | 135 | | | 2.4 |
| $H_2$ | | 5600 | | | | 2980 |
| $D_2$ | | 4800 | | | | 2580 |
| CO | | 224 | 200 | | | 2.9 |
| Ar | | 500 | | | | 13 |
| Ne | | 1480 | | | | 548 |
| $He/CH_4$ | 20 | | | 25.5 | 23.4 | 775 |
| $CO_2/CH_4$ | | | | 18.5 | | 29 |
| $O_2/N_2$ | | | 4.7 | | | 24 |
| $H_2/CO$ | | 25 | | | | 1030 |
| $H_2/D_2$ | | 1.17 | | | | | meabilities of untreated films, as well as the separation factors for various pairs of gases.

*The several untreated films tested were all from the same roll of film. The results obtained illustrate typical variations in observed permeabilities. Table IV 1.0 mil C-4 Polycarbonate Film; Treatment — 400 seconds at 2.2 kV DC, 1 kV and 50 kHz AC, 4.2 to 4.8mA, at a pressure in the $10^{-5}$ torr region.

TABLE V 1.5 mil C-4 Polycarbonate Film; Treatment - 500 seconds at 2.2 kV DC, 1 kV and 50 kHz AC, 3.5 mA, in the $10^{-5}$ torr pressure region

| Gas | Permeability Constant × $10^{12}$, or Separation Factor |
|---|---|
|  | After Treatment |
| He | 7500* |
| $CH_4$ | 6.45 |
| $CO_2$ | 1020 |
| $O_2$ | 182 |
| $N_2$ | 24.4 |
| $H_2$ | 5700* |
| $D_2$ | 6060* |
| CO | 20 |
| Ar | 29 |
| Ne | 1120 |
| He/$CH_4$ | 1160 |
| $CO_2$/$CH_4$ | 158 |
| $O_2$/$N_2$ | 7.5 |
| $H_2$/CO | 285 |

* Increase may be caused by change in crystallinity or by non-uniform sample thickness, which would cause an error in calculation.

TABLE VI 1 mil C-4 Polycarbonate Film; Treatment - 600 or 800 seconds at 2.2 kV DC, 1 kV and 50 kHz AC, 4.0 mA, in the $10^{-5}$ torr pressure region

| Gas | Permeability Constant × $10^{12}$, or Separation Factor | |
|---|---|---|
|  | After treatment | |
|  | 600 seconds | 800 seconds |
| He | 4330 | 6000* |
| $CH_4$ | 5.1 | 5.7 |
| $H_2$ | 2760 | 1190 |
| $D_2$ | 2380 | 1128 |
| $CO_2$ | 1230 | 645 |
| He/$CH_4$ | 850 | 1050 |
| $CO_2$/$CH_4$ | 241 | 113 |
| $H_2$/$D_2$ | 1.27 | 1.05 |

*Increase may be caused by change in crystallinity or by non-uniform sample thickness, which would cause an error in calculation.

EXAMPLE 8

By procedures analogous to those described in Examples 1 and 7, a series of "LEXAN" films were subjected to low energy electron beam treatment. The permeabilities of these films, both untreated and after treatment, were measured for various gases. The conditions of treatment, permeabilities, and selected separation factors are displayed in Table VII, below:

TABLE VII 1 mil "LEXAN" film — Treatment as indicated below.

| Gas | Permeability Constant × $10^{12}$, or Separation Factor | | |
|---|---|---|---|
|  | Untreated Samples | After Treatment | |
|  |  | 200 sec., 2.1–3.4 kV DC; 1.0 kV, 50 kHz AC; 20–15 mA, at $10^{-5}$ Torr[1] | 1500 seconds, 2.2 kV DC; 1.0 kV, 50 kHz AC, 6 to 7 mA 1–3 × $10^{-4}$ Torr |
|  |  |  | (Two samples) |
| He | 1200–1550 | 800 | 400   188 |
| $CH_4$ | 33–45 | <4 | <2 |
| Ne | 205 | 100 |     9.1 |
| He/$CH_4$ | 33–46 | >200 | >200 |
| He/Ne | 6.7 | 8–10 |     20.6 |

[1] 20 mA decreased to 15 during first 100 seconds; 2.1 kV raised to 3.4 kV at 75 seconds.

EXAMPLE 9

A feature of this invention which makes it more economical than high energy electron beam treatment, is that the process is limited in its effect to a thin layer near the surface.

For example, two films of C–4 polycarbonate were exposed to the e-beam in the apparatus of FIG. 1 for 700 seconds at 4 ma with 2.2 kv DC and 1.0 AC (circuit 6). Both developed a brown surface layer. One was tested for helium and methane permeability and gave $P_{He}=3200 \times 10^{-12}$, $P_{CH}$ = less than $4 \times 10^{-12}$, and a separation factor of greater than 300. The other sample was swollen in acetone. The brown surface layer sloughed off. The underlying film was tested for helium and methane permeabilities to give $P_{He}=3000 \times 10^{-12}$, $P_{CH}$ =248 × $10^{-12}$, $\alpha$=12 (starting $P_{He}$=4000–4500, $P_{CH}$ =200–250 × $10^{-12}$, $\alpha$ = 20 to 25).

Further study of this surface layer showed that it was insoluble in chloroform (a good solvent for polytetramethyl cyclobutanediol carbonate) and that the amount isolated from six treated samples weighed 9.1 mg. The heavily treated area of each sample (as mentioned above) is approximately 40 cm², so that the coating weighed approximately 9.1 mg per 240 cm². If the density of the coating is assumed to be 1.0 g/cm³, the layer is approximately 0.37 μm (3,700 A) thick. Alternatively, if the density of the coating is assumed to be that of untreated polytetramethyl cyclobutanediol carbonate (1.07 g/cm³), the thickness is approximately 0.35 μm (3,500 A) thick. Extrapolation of the data on electron ranges in thin organic films in B. Broyde, J. Electrochem. Soc., 116, 1241–1245(1969), shows that the expected range for 2.2 kV electrons will be between 0.1 and 0.3 μm. Since some of the change in the polymer film surface may result from reactive molecular fragments which have diffused into the film, and some of the surface layer that was isolated may have come from outside the most directly treated area, the agreement between observed depth of surface change and expected electron range is reasonable.

It is instructive to compare the energy deposited in the polymer film by this low energy electron process with energy deposition typical of high energy electron irradiation. Let us assume that each electron transfers 2.2 keV to the surface layer (approximately 0.3 μm thick) of the polymeric film when it is accelerated by a 2.2 kV field. In an experiment using 4 mA for 700 second, a surface layer approximately 40 cm² of the in area approximately 0.3 μm thick and weighing 1.52 mg absorbs $4.1 \times 10^6$ watt-seconds per gram. This energy absorption is equal to $4.1 \times 10^5$ Megarads. Even if only a substantial portion of this energy were absorbed, it would be impractical and uneconomical to give such a large dose to more than a very thin surface layer — for example, by use of million volt Van de Graaff accelerators with much greater penetration. Indeed, doses of 1 to only about 40 Megarads are commonly used in high energy electron radiation treatment of plastics.

Thus, treatment of only a very thin layer of material is necessary to produce significant changes in gas separation characteristics. Indeed, successful results as voltages one tenth or less that used for this experiment suggest that a layer of only hundreds of Angstroms need be modified.

Samples of both untreated C-4 and Lexan polycarbonate film, and the treated surface layers of both types of films, were subjected to elemental analyses. The results were as follows:

Lexan Polycarbonate

|   | Untreated | | Treated Surface Layer | |
|---|---|---|---|---|
| C | 75.3, | 75.2 | 71.5, | 72.2 |
| H | 5.6, | 5.5 | 8.2, | 8.6 |
| O | 19.8, | 19.7 | 12.2, | 12.2 |
| N | 0.15, | 0.12 | 0.46, | 0.33 |
| Ash | 0 | | 6.5, | 6.3 |

C-4 Polycarbonate

|   | Untreated | | Treated Surface Layer | |
|---|---|---|---|---|
| C | 63.4, | 63.5 | 66.6, | 72.3 |
| H | 8.4, | 8.3 | 7.4, | 7.4 |
| O | 27.6, | 27.9 | 18.8, | 17.7 |
| N | 0.17, | 0.12 | 0.26, | 0.32 |

In both cases, treatment of the film appears to have resulted in a significant reduction in oxygen content of the treated surface layer. The reduction in oxygen content and the above-discussed alteration of the solubility characteristics clearly is evidence of a permanent chemical change in the surface layer as a result of the electron beam treatment of the invention.

The treatment conditions for the samples that were subjected to elemental analyses were as follows:

C-4 polycarbonate - Apparatus and circuit of FIG. 1, 2.2 kV DC, 10mA, $10^{-5}$ torr pressure region, for 700 seconds;

Lexan - Apparatus and circuit of FIG. 2, a 15-inch wide strip of film wrapped around the treatment roller, each portion treated for about 500 seconds at 2 kV DC, 45 mA, in the $1.5 \times 10^{-4}$ torr pressure region. Each individual treated portion was 15 inches wide by about 1½ to 2 inches.

EXAMPLE 10

A series of 1-mil C-4 polycarbonate films were exposed to low energy electron beam treatment by a procedure analogous to that described in Example 1 using the apparatus of FIG. 1 and the circuitry of either FIG. 6 (AC plus DC) or FIG. 1 (DC only). The pressure in each experiment was in the $10^{-5}$ torr region, except for sample No. 17, for which a pressure of about $4 \times 10^{-4}$ torr was used, sample No. 37, for which a pressure of about $10^{-4}$ torr was used, and sample Nos. 7, 11, and 38, wherein the pressure rose into the $10^{-4}$ torr region during the first part of the experiment. In sample Nos. 19-30, the pressure gauge was broken, however, the conditions used were those that yielded a pressure in the $10^{-5}$ torr region in other experiments. Table VIII, below, displays the experimental conditions employed, the product of mA x seconds, the product volt-amp x seconds, the permeability constant of the treated films for helium and methane, and the separation factor, $\alpha He/CH_4$. The electron beam source was the above-described MRC gun in sample Nos. 1-18, and 35-38, and the filament shown in FIG. 7 in sample Nos. 19-34. In sample Nos. 19-22, the experiment was adjusted to give a DC emission of 50 mA, but the meter broke and the exact emission was unknown. In sample Nos. 35-36, the film was coated with a layer of gold by vacuum evaporation prior to the electron beam treatment. In sample Nos. 37-38, the bent electron beam apparatus of FIG. 4 was employed. The filament to sample distance was 4½ inches in all cases except for sample Nos. 31-34, wherein a distance of 2½ inches was used, and 37-38, in which the bent electron beam arrangement was used.

TABLE VIII

Electron Beam Treatment of Tetramethylcyclobutanediol Polycarbonate

| Experiment | AC kV | AC kHz | DC kV | Emission mA | Time, sec | mA × secs. | Volt-amp seconds | $P_{He} \times 10^{12}$ | $P_{CH} \times 10^{12}$ | $\alpha He/CH_4$ |
|---|---|---|---|---|---|---|---|---|---|---|
| For Range of apparent values for untreated film, see Table IV, above | | | | | | | | 4000-5510 | 182-224 | 20-25.5 |
| 1 | 1 | 50 | 2.1 | 3.8 | 50 | 190 | 400 | 4500 | 154 | 29 |
| 2 | 1 | 50 | 2.1 | 3.7 | 100 | 370 | 780 | | | |
| 3 | 1 | 50 | 2.1 | 3.4 | 200 | 680 | 1430 | 3320 | 51 | 65 |
| 4 | 1 | 50 | 2.2 | 5.0 | 300 | 1500 | 3300 | 4820 | 120 | 140 |
| 5 | 1 | 50 | 2.2 | 4.2 | 400 | 1680 | 3700 | 3640 | 4.7 | 775 |
|   |   |   |   |   |   |   |   | 7500 | 6.45 | 1160 |
| 6 | 1 | 50 | 2.2 | 3.5 | 500 | 1750 | 3850 | 4000 | 6 | 670 |
| 7 | 1 | 50 | 2.2 | 4.0 | 500 | 200 | 4400 | 4800 | 14.4 | 330 |
| 8 | 1 | 50 | 2.2 | 4.0 | 600 | 2400 | 5280 | 4400 | <8 | >540 |
| 9 | 1 | 50 | 2.2 | 4.0 | 800 | 3200 | 7040 | 6000 | <8 | >750 |
| 10 | 1 | 50 | 2.2 | 4.0 | 1000 | 4000 | 8800 | 3400 | 23 | 148 |
| 11 | none | | 2.2 | 4.0 | 500 | 2000 | 4400 | 4330 | <8 | >540 |
| 12 | do. | | 2.2 | 4.0 | 750 | 3000 | 6600 | 4400 | 021 8 | >550 |
| 13 | do. | | 2.2 | 4.0 | 1000 | 4000 | 8800 | 2400 | 33 | 73 |

TABLE VIII — Continued

Electron Beam Treatment of Tetramethylcyclobutanediol Polycarbonate

| Experiment | AC kV | AC kHz | DC kV | Emission mA | Time, sec | mA × secs. | Volt-amp seconds | $P_{He} \times 10^{12}$ | $P_{CH} \times 10^{12}$ | $\alpha He/CH_4$ |
|---|---|---|---|---|---|---|---|---|---|---|
| 14 | 1.0 | 50 | 2.2 | 8.0 | 250 | 2000 | 4400 | 4330 | 8 | 550 |
| 15 | do. | 50 | 2.2 | 16.0 | 125 | 2000 | 4400 | 2530 | 10.8 | 234 |
| 16 | do. | 50 | 3.0 | 21.0 | 62 | 1300 | 3900 | melted | | |
| 17 | do. | 50 | 2.2 | 4.0 | 800 | 3200 | 7040 | 500 | ≤4 | >125 |
| 18 | (Filament hot, no accelerating voltage) | | | 480 | 0 | 0 | 4300 | 190 | 22 | |
| 19 | 1 | 50 | 1.9 | (50) | 20 | (1000) | (1900) | 2200 | 16 | 137 |
| 20 | 1 | 50 | 1.9 | (50) | 40 | (2000) | (3800) | 4200 | <4 | >1000 |
| 21 | 1 | 50 | 1.9 | (50) | 8 | (400) | (760) | pinholed | | |
| 22 | 1 | 50 | 1.9 | (50) | 16 | (800) | (1520) | pinholed | | |
| Grounded Filament | | | | | | | | | | |
| 23 | — | — | 2.25 | 10 | 75 | 750 | 1690 | | | |
| 24 | — | — | 2.25 | 10 | 125 | 1250 | 2810 | | | |
| 25 | — | — | 2.25 | 10 | 250 | 2500 | 5625 | 2800 | 36 | 78 |
| 26 | — | — | 2.25 | 10 | 375 | 3750 | 8440 | 3620 | 60 | 60 |
| Grounded Sample Plate | | | | | | | | | | |
| 27 | — | — | 2.25 | 10 | 75 | 750 | 1690 | | | |
| 28 | — | — | 2.25 | 10 | 125 | 1250 | 2810 | | | |
| 29 | — | — | 2.25 | 10 | 250 | 2500 | 5625 | 3400 | 60 | 57 |
| 30 | — | — | 2.25 | 10 | 375 | 3750 | 8440 | 5120 | 107 | 49 |
| High Intensity | | | | | | | | | | |
| 31 | — | — | 2.1 | 10 | 400 | 400 | 8400 | 4640 | 40 | 116 |
| 32 | — | — | 1.2 | 100 | 130 | 13,000 | 15,600 | melted | | |
| 33 | — | — | 2.1 | 10 | 400 | 4000 | 8400 | 3640 | 10 | 364 |
| 34 | — | — | 1.8 | 50 | 604 | 30,200 | 54,400 | charred, melted | | |
| Gold Coated Samples | | | | | | | | | | |
| 35 | | | 5–50 | 2 | 15 | | | melted | | |
| 36 | 1 | 50 | 2.2 | 2 | 800 | 1600 | 3520 | 4000 | 32 | 125 |
| Bent Beam Experiments | | | | | | | | | | |
| 37 | — | — | 1.5 | 10 | 700 | 7000 | 10500 | 5000 | 16 | 312 |
| 38 | — | — | 2.5 | 10 | 1000 | 1000 | 25000 | 5000 | <4 | 1250 |

EXAMPLE 11

A series of Lexan™ films were exposed to the electron beam treatment of the invention by a procedure analogous to that described in Example 1. The treated films were then evaluated for helium and methane permeabilities. Table IX, below, displays the experimental conditions and the permeabilities. The apparatus of FIG. 1 was used for each sample, except as indicated below, with the circuitry of either FIG. 1 (DC only), FIG. 5 (AC only), or FIG. 6 (DC plus AC). The MRC electron gun was used as the electron beam source for all samples except Nos. 61–63, in which the filament of FIG. 7 was used. In sample Nos. 41–43, the bent beam apparatus of FIG. 4 was used. Filament to sample distance was 4½ inches, unless stated otherwise.

TABLE IX

Electron Beam Treatment of Lexan™

| Sample number | AC Kv. | AC kHz. | DC (kv.) | Emission (ma.) | Pressure (torr) | Time (sec.) | Ma. (secs.) | Volt-amp (seconds) | $P_{He} \times 10^{12}$ | $P_{CH_4} \times 10^{12}$ | $\alpha He/CH_4$ |
|---|---|---|---|---|---|---|---|---|---|---|---|
| Range of controls (See Table VII). | | | | | | | | | (1,200–1,550) | (33–45) | (30–46) |
| 1 | 1 | 50 | 2.2 | 7 | $10^{-4}$ | 25 | 175 | 385 | 960 | <4 | >240 |
| 2 | 1 | 50 | 2.2 | 7 | $10^{-4}$ | 50 | 350 | 770 | 1,120 | 32 | 35 |
| 3 | 1 | 50 | 2.2 | 7 | Low $10^{-4}$ | 200 | 1,400 | 3,080 | 1,440 | <2 | >720 |
| 4 | 1 | 50 | 2.2 | 5 | $10^{-5}$ | 800 | 4,000 | 8,800 | 1,280 | <2 | >640 |
| 5 | 1 | 50 | 2.2 | 10 | $10^{-4}$ | 400 | 4,000 | 8,800 | 800 | <4 | >200 |
| 6 | 1 | 50 | 2.2 | 8 | $10^{-5}$ to $10^{-4}$ | 800 | 6,400 | 14,080 | 1,120 | <2 | >560 |
| 7 | 1 | 50 | 2.2 | 7 | Low $10^{-4}$ | 1,000 | 7,000 | 15,400 | 800 | <2 | >400 |
| 8 | 1 | 50 | 2.2 | 5 | Low $10^{-4}$ | 1,600 | 8,000 | 17,600 | 960 | 10 | 96 |
| 9 | 1 | 50 | 2.2 | 6 | $1-3 \times 10^{-4}$ | 1,500 | 9,000 | 19,800 | 400 | <2 | >200 |
| 10 | 1 | 50 | 2.2 | 7 | $10^{-4}$ | 2,000 | 12,000+ | 26,400+ | 200 | 2.8 | 71 |
| 11 | 0.5 | 50 | 1.0 | 6–8 | $10^{-5}$ | 800 | 4,800+ | 4,800+ | 1,120 | 2 | 560 |
| 12 | 0.25 | 50 | 0.5 | 2 | $10^{-5}$ | 800 | 1,600 | 800 | 1,280 | <2 | >640 |
| 13 | 0.125 | 50 | 0.25 | 1 | $10^{-5}$ | 1,000 | 1,000 | 250 | 1,440 | <2 | >720 |
| 14 | None | | 4.0 | 7 | $10^{-5}$ | 800 | 5,600 | 22,400 | (a) | | |
| 15 | None | | 3.0 | 7 | $10^{-5}$ | 800 | 5,600 | 16,800 | 800 | 4 | 200 |
| 16 | None | | 1.0 | 3 | $10^{-5}$ | 800 | 2,400 | 2,400 | 100 | <4 | >25 |
| 17 | None | | 1.0 | 0.8 | $10^{-5}$ | 800 | 640 | 640 | 1,440 | <2 | >720 |
| 18 | None | | 0.5 | 2.7 | $10^{-5}$ | 800 | 2,160 | 1,080 | 1,280 | <2 | >640 |
| 19 | None | | 0.25 | 1.4 | $10^{-5}$ | 800 | 1,120 | 280 | 1,120 | <2 | >560 |
| 20 | 1 | 50 | None | 2.5 | $10^{-5}$ | 800 | 2,000 | 1,000 | 1,280 | <2 | >640 |
| 21 | .5 | 50 | None | 1 | $10^{-5}$ | 1,000 | 1,000 | 250 | 1,440 | <2 | >720 |
| 22 | .25 | 50 | None | 2 | $10^{-5}$ | 1,000 | 2,000 | 250 | 1,440 | <2 | >720 |
| 23 | .125 | 50 | None | 1 | $10^{-5}$ | 1,000 | 1,000 | 63 | 1,600 | 36 | 44 |
| 24 | 1 | 5 | None | 2.5 | $10^{-5}$ | 800 | 2,000 | 500 | 1,120 | <2 | >560 |
| 25 | 1 | .5 | None | 3.0 | $10^{-5}$ | 800 | 2,400 | 1,200 | 960 | <2 | >480 |
| 26 | 1 | .06 | None | 2.5 | $10^{-5}$ | 800 | 2,000 | 1,000 | 1,120 | <2 | 560 |
| 27 | .22 | .06 | None | 0.2 | $10^{-5}$ | 1,600 | 320 | 35 | 800 | 16 | 50 |
| 28 | .44 | .06 | None | 0.3 | $10^{-5}$ | 1,600 | 480 | 105 | 800 | <4 | >200 |
| 29 | 1 | 50 | 2.2 | b 10 | $10^{-4}$ | 200 | 2,000 | 4,400 | 960 | 20 | 48 |
| 30 | 1 | 50 | 2.2 | 7–8 | Low $10^{-4}$ | 600 | 4,800 | 9,240+ | 1,440 | 16 | 90 |

TABLE IX — Continued

Electron Beam Treatment of Lexan™

| Sample number | AC Kv. | AC kHz. | DC (kv.) | Emission (ma.) | Pressure (torr) | Time (sec.) | Ma. (secs.) | Volt-amp (seconds) | $P_{He} \times 10^{12}$ | $P_{CH} \times 10^{12}$ | $\alpha_{He/CH_4}$ |
|---|---|---|---|---|---|---|---|---|---|---|---|
| 31 | 1 | 50 | 2.2 | 20 | $10^{-4}$ | 60 | Aimed at metal | | 1,280 | 6 | 213 |
| 32 | 1 | 50 | 4.2 | 7 | $10^{-4}$ | 800 | 5,600 | 23,500 | (a) | | |
| 33 | 1 | 50 | 3.5 | 7 | $10^{-4}$ | 800 | 5,600 | 19,600 | (a) | | |
| 34 | 1 | 50 | 3.0 | 7 | $10^{-4}$ | 800 | 5,600 | 16,800 | 2,000 | <1 | >500 |
| 35 | 1.1 | 50 | 0 | 2 | $10^{-5}$ | 800 | 1,600 | 880 | 1,280 | <1 | >320 |
| 36 | 0.5 | 50 | 0 | 0.5 | $10^{-5}$ | 800 | 400 | 100 | 1,440 | 24 | 60 |
| 37 | 1 | 50 | 1 | 7 | $10^{-5}$ | 800 | 5,600 | 5,600 | 1,280 | 16 | 80 |
| 38 | 0.5 | 50 | 1 | 7 | $10^{-5}$ | 800 | 5,600 | 5,600 | 1,200 | 8 | 150 |
| 39 | 0.25 | 50 | 0.5 | 7 | $10^{-5}$ | 800 | 5,600 | 2,800 | 1,600 | 4 | 400 |
| 40 | | | 2.0 | 7 | $10^{-5}$ | 4×200 | 5,600 | 11,200 | 800 | <1 | >200 |
| Bent Beam Experiments | | | | | | | | | | | |
| 41 | | | 1.5 | 6–10 | $10^{-5}$ | 700 | 4,200+ | 6,300+ | 1,280 | 4 | 320 |
| 42 | | | 2.5 | b 7–10 | $10^{-5}$ | 1,000 | 7,000+ | 17,500+ | 960 | <2 | >480 |
| 43 | | | 2.0 | 7 | $10^{-5}$ | 800 | 5,600 | 11,200 | 1,440 | <2 | >720 |
| Variable Distance Experiments | | | | | | | | | | | |
| 44 | 1 | 50 | 2.2 | c 7 | $10^{-5}$ | 800 | 5,600 | 12,300 | 1,120 | <2 | >560 |
| 45 | 1 | 50 | 2.2 | 7 | $10^{-5}$ | 800 | 5,600 | 12,300 | 1,280 | <2 | >640 |
| 46 | 1 | 50 | 2.2 | d 7 | $10^{-5}$ | 800 | 5,600 | 12,300 | 1,440 | <2 | >720 |
| 47 | 1 | 50 | 2.2 | 5–7 | $2-3\times10^{-5}$ | 400 | 2,630 | 5,900 | 800 | 12 | 76 |
| 48 | 1 | 50 | 2.2 | 5–7 | $4-6\times10^{-5}$ | 400 | 2,720 | 6,000 | 800 | <2 | >400 |
| 49 | 1 | 50 | 2.2 | 5–7 | $5\times10^{-4}$ (He added). | 400 | 2,540 | 5,600 | 880 | 4 | 220 |
| 50 | 1 | 50 | 2.2 | 4–6 | $0.8-1.0\times10^{-4}$ (He added). | 400 | 2,000 | 4,400 | 1,280 | 8 | 160 |
| 51 | 1 | 50 | 2.2 | 4–7 | $1\times10^{-3}$ (He added). | 400 | 2,450 | 5,390 | 800 | 8 | 100 |
| 52 | 1 | 50 | 2.2 | 7 | $5\times10^{-3}$ (He added). | 400 | 2,800 | 6,160 | 240 | <2 | >120 |
| 53 | 1 | 50 | 2.2 | 7 | $4\times10^{-5}$ (Ar added). | 400 | 2,800 | 6,160 | 400 | 4 | 100 |
| 54 | 1 | 50 | 2.2 | 5–7 | $4-10\times10^{-5}$ (Ar added). | 400 | 2,640 | 5,810 | 1,200 | 4 | 300 |
| 55 | 1 | 50 | 2.2 | 7 | $5\times10^{-4}$ | 1,000 | 7,000 | 15,400 | 1,330 | 4 | >333 |
| 56 | 1 | 50 | 2.2 | 7 | $5\times10^{-4}$ | 800 | 5,600 | 12,300 | 1,800 | <4 | >450 |
| 57 | 1 | 50 | 2.1–3.4 | 15–20 | $10^{-5}$ | 200 | 3,350 | ~9,600 | 800 | <4 | >200 |
| 58 | 1 | 50 | 2.1 | 7 | $10^{-5}$ | 800 | 5,600 | 11,800 | 250 | 20 | 12 |
| 59 | 1 | 50 | 2.1 | 7 | $10^{-5}$ | 600 | 4,200 | 8,800 | 40 | 12 | 3 |
| 60 | 1 | 50 | 3.5 | 10 | $10^{-5}$ | 400 | 4,000 | 14,000 | 1,120 | 4 | 280 |
| 61 | 1 | 50 | 2.2 | 10 | (e) | 1,000 | 10,000 | 22,000 | 1,040 | <4 | >250 |
| 62 | 1 | 50 | 2.2 | 10 | (e) | 500 | 5,000 | 11,000 | | | |
| 63 | 1 | 50 | 2.2 | 10 | (e) | 250 | 2,500 | 5,500 | | | | a Pin holes.
b Short increase to over 20 ma. owing to pressure surge.
c 7 inches.
d 4.5 inches.
e Pressure gauge broken.

NOTE.—Approximate area of direct treatment in Sample Nos. 44–46 were as follows

| Sample number | Distance, inches, filament to sample | Approximate area treated, cm.² |
|---|---|---|
| 44 | 7 | 80 |
| 45 | 2 | 11 |
| 46 | 4.5 | 40 |

EXAMPLE 12

Treatment of asymmetric cellulose acetate membrane.

A sample of asymmetric cellulose acetate (CA) membrane prepared according to the aforesaid copending application Ser. No. 7450 filed Sept. 22, 1970, (D-8251) from Eastman Kodak RO-89 reverse osmosis membrane was exposed to low energy electron beam treatment on the apparatus of FIG. 2, using the DC circuit of FIG. 1. The treatment was carried out in several steps during an attempt to further define the process conditions required, and may not represent the most expeditious or practical series of steps to modify such a material. Instead, it is intended to show the striking results that can be obtained by proper choice of conditions.

At first, a strip of material was treated exactly as described above in Example 5. The results are presented in Table X.

Table X[1]

Treatment of Asymmetric CA Membrane

| Treatment | $P_{He} \times 10^{12}$ | $P_{CH} \times 10^{12}$ | He/CH$_4$ |
|---|---|---|---|
| None | 800 | 16 | 50 |
| vacuum only | 1120 | 72 | 15.5 |
| one pass | 1120 | 6.4 | 175 |
| two passes | 1040 | 4.8 | 217 |

[1]The different results obtained here, particularly for the untreated material, compared with the data presented above in Table I in Example 5, reflects a difference in starting material as a result of different dehydration conditions for the asymmetric cellulose acetate membrane.

Examination of FIG. 2 shows that each end of the strip being treated does not pass under the filament. This can be avoided by attaching "leader" and "tailer" strips to the strip undergoing treatment. In this case, the end strip of the sample described in Table X (exposed only to vacuum) was removed, a "leader" and "tailer" added, and the end strip was further exposed at 4 seconds residence time per pass to the series of treatments indicated in Table XI. After each treatment, the bell jar was vented to one atmosphere and a 3 inch by 3 inch sample was removed for testing. Table XI gives the results of testing each of these samples:

Table XI

Further Treatment of C.A. Sample

| Treatment Conditions | | | | Results | | |
|---|---|---|---|---|---|---|
| DC Voltage | mA Current | Pressure | Passes | $P \times 10^{12}$ | | $\alpha$ |
| | | | | $P_{He}$ | $P_N$ | $He/N_2$ |
| 0 | 0 | $2 \times 10^{-5}$ | 2 (heat only) | | | |
| 620 | 30 | $1 \times 10^{-4}$ | 1 | 1600 | 12.5 | 128 |
| (Pumped overnight in high $10^{-6}$ torr region) | | | | | | |
| 620 | 30 | $9 \times 10^{-5}$ | 1 | 1600 | 11 | 145 |
| 0 | 0 | — | 1 (heat only) | | | |
| 620 | 30 | $6 \times 10^{-5}$ | 1 | 1900 | 12 | 158 |
| 0 | 0 | $1 \times 10^{-5}$ | 1 (heat only) | | | |
| 620 | 30 | $6-9 \times 10^{-5}$ | 1 | 1700 | 15 | 113 |
| 0 | 0 | high $10^{-5}$ | 1 (heat only) | | | |
| 600 | 45 | high $10^{-5}$ | 2 | 1500 | 11 | 136 |
| 400 | 45* | $1 \times 10^{-4}$ | 4 | | | |

*The meter broke at this point but the conditions were approximately the same as the preceding sample.

The last sample was not immediately evaulated. When it was tested five weeks later, it showed these remarkable results:

Table XII

| Gas | Permeability constant $\times 10^{12}$ | Sep. Factor |
|---|---|---|
| $N_2$ | 0.85 | $He/N_2 = <1000$ |
| He | 850–975 | $He/CH_4 = 3400-5100$ |
| $CH_4$ | 0.19–.25 | |
| $H_2$ | 515–520 | $H_2/D_2 = 1.63$ to $1.11^*$ |
| $D_2$ | 460–320 | |
| CO | 1.18 | $H_2/CO = 440$ |
| Ar | 3.7, 4.2 | |
| $O_2$ | 17, 16 | |
| $N_2$ (recheck) | 0.76 | $He/N_2 = >1000$ |
| $CO_2$ | 52 | |
| Ne | 90–114 | $He/Ne = 10.85-7.46$ |
| Xe | 0.19 | |
| $C_2H_6$ | <0.03 | |
| $C_2H_4$ | 0.06 | |

*result varied; presently unable to explain cause of variation

It is apparent that these results are strikingly better than the previously cited data (i.e., that presented in Tables I, X, and XI). While these results presently appear to be anomalous, they are cited to show that further routine experimentation within the teachings herein can reasonably be expected to produce further significant improvements in the process. They also show that electron beam treated asymmetric cellulose acetate membranes can be given enhanced separation ability for gases other than helium and methane or helium and nitrogen.

EXAMPLE 13

A series of films made from two siloxane copolymers, MEM—213 and polydimethylsiloxane/polyarylene polyether sulfone (as described above), were exposed to low energy electron beam treatment by procedures analogous to that described in Example 1 using the apparatus of FIG. 1 and the circuitry of either FIG. 1 (DC only) or FIG. 6 (DC plus AC). Tables XIII and XIV, below, display the experimental conditions used and the results of permeability evaluations. The electron beam source was the MRC gun, which was maintained at a distance of 5¼ to 5½ inches from the film to be treated in Sample Nos. 3–9 of the MEM-213 samples and all of the samples in Table XIV. (Treated area about 50 cm².) In samples Nos. 10–22 of the MEM-213 samples, the MRC gun was the usual 4½ inches from the film. The emission values that are in parentheses are estimated from other examples using similar control settings, since the meter was either broken or not used. A particularly striking result is the change of permeability ratios from less than 1.0 to greater than 1.0 for $He/CH_4$ and $H_2/C_2H_2$.

TABLE XIII

Low Energy Electron Treatment of MEM-213, 1-mil Film

| Sample number | 50 kHz. AC (kv.) | DC (kv.) | Emission (ma.) | Pressure region (torr) | Time (sec.) | Ma. (sec.) | Volt-amp (sec.) | Permeabilities $\times 10^{12}$ and separation factors | | | | | |
|---|---|---|---|---|---|---|---|---|---|---|---|---|---|
| | | | | | | | | $P_{He}$ | $P_{CH_4}$ | $\alpha He/CH_4$ | $P_{H_2}$ | $P_{C_2H_2}$ | $\alpha H_2/C_2H_2$ |
| 1 untreated | | | | | | 0 | 0 | 6,400 | 11,200 | 0.57 | 10,600 | 31,000 | 0.34 |
| 2 untreated | | | | | | 0 | 0 | 8,500 | 15,400 | 0.55 | 13,300 | 26,000 | 0.51 |
| 3 | | 2.2 | (4) | $4\times10^{-5}$ | 15 | (60) | (132) | 8,900 | 13,300 | 0.67 | 13,300 | 66,700 | 0.2 |
| 4 | | 2.2 | (4) | $4\times10^{-5}$ | 5 | (20) | (44) | 8,000 | 20,000 | 0.40 | 13,300 | 10,000 | 1.3 |
| 5 | | 2.2 | (4) | $2\times10^{-5}$ | 15 | (60) | (132) | 6,680 | 10,000 | 0.67 | 13,200 | 13,800 | 1.0 |
| 6 | | 2.2 | (4) | $2\times10^{-5}$ | 5 | (20) | (44) | 8,000 | 16,000 | 0.5 | 13,300 | 40,000 | 0.33 |
| 7 | | 2.2 | (4) | Low $10^{-5}$ | 20 | (80) | (176) | 8,000 | 8,000 | 1.0 | 13,300 | 20,000 | 0.67 |
| 8 | | 2.2 | (4) | Low $10^{-5}$ | 26 | (104) | (230) | 16,000 | 6,700 | 2.4 | | | |
| 9 | | 2.2 | (4) | Low $10^{-5}$ | 30 | (120) | (264) | 8,000 | 10,000 | 0.8 | 13,300 | 3,000 | 4.3 |
| 10 | | 2.2 | 4 | $10^{-5}$ | 60 | 240 | 530 | 5,600 | 200 | 28 | | | |
| 11 | | 2.2 | 4 | $10^{-5}$ | 120 | 480 | 1,060 | | | | 6,400 | 350 | 18 |
| 12 | | 2.2 | 4 | $10^{-5}$ | 40 | 160 | 350 | 6,400 | 160 | 40 | | | |
| 13 | | 2.2 | 4 | $10^{-5}$ | 90 | 360 | 790 | | | | 3,360 | 440 | 7.6 |
| 14 | 1 | 2.2 | 5–7 | $10^{-5}$ | 800 | 4,000+ | 8,800+ | 2,500 | 160 | 16 | | | |
| 15 | 1 | 2.2 | 4 | $10^{-5}$ | 1,000 | 4,000 | 8,800 | 4,440 | 160 | 28 | | | |
| 16 | 1 | 2.2 | 4 | $10^{-5}$ | 500 | 2,000 | 4,400 | 5,700 | 200 | 29 | | | |

TABLE XIII—Continued

Low Energy Electron Treatment of MEM-213, 1-mil Film

| Sample number | 50 kHz. AC (kv.) | DC (kv.) | Emission (ma.) | Pressure region (torr) | Time (sec.) | Ma. (sec.) | Volt-amp (sec.) | $P_{He}$ | $P_{CH_4}$ | $\alpha He/CH_4$ | $P_{H_2}$ | $P_{C_2H_2}$ | $\alpha H_2/C_2H_2$ |
|---|---|---|---|---|---|---|---|---|---|---|---|---|---|
| 17 | 1 | 2.2 | 4 | $10^{-5}$ | 250 | 1,000 | 2,200 | 6,700 | 111 | 60 | | | |
| 18 | 1 | 2.2 | 4 | $10^{-5}$ | 120 | 480 | 1,050 | 8,000 | 110 | 73 | | | |
| 19 | 1 | 2.2 | 10 | High $10^{-5}$ | 500 | 5,000 | 11,000 | 2,400 | 180 | 13 | | | |
| 20 | 1 | 2.2 | 10 +4 | $10^{-5}$ | 220 / 30 | 2,320 | 5,100 | 4,800 | 124 | 39 | | | |
| 21 | 1 | 2.2 | 10 | $10^{-5}$ | 1,000 | 10,000 | 22,000 | 2,100 | 6,000 | 0.3 | | | |
| 22 | 1 | 2.2 | 5 | $10^{-5}$ | 2,000 | 10,000 | 22,000 | 3,600 | 480 | 7.5 | | | |

Table XIV

Low Energy Electron Treatment of 1-mil silicone/polysulfone

| Sample No. | DC kV | Emission mA | Pressure Region Torr | Time sec | mA sec | Volt-Amp sec | $P_{He}$ | $P_{CH_4}$ | $\alpha He/CH_4$ | $P_H$ | $P_{C_2H}$ | $\alpha H_2/C_2H_2$ |
|---|---|---|---|---|---|---|---|---|---|---|---|---|
| 1 untreated (two separate films) | — | — | — | — | 0 | 0 | 22,500 | 48000 | 0.47 | 40000 | 90000 | 0.44 |
| 2 | 2.2 | 1.5 | $10^{-5}$ | 10 | 15 | 33 | | | | | | |
| 3 | 2.2 | 1.5 | $10^{-5}$ | 15 | 23 | 51 | | | | | | |
| 4 | 2.2 | 1.5 | $10^{-5}$ | 30 | 45 | 99 | | | | | | |
| 5 | 2.2 | 1.4 | $10^{-5}$ | 60 | 84 | 184 | 20,000 | 6160 | 3.25 | 29600 | 18200 | 1.6 |
| 6 | 2.2 | 1.4 | $10^{-5}$ | 120 | 170 | 370 | 15,000 | 6680 | 2.3 | 26000 | 7140 | 3.6 |
| 7 | 2.0 | 5 | $10^{-5}$ | 400 | 2000 | 4000 | 12,800 | 3840 | 3.3 | 14800 | 6100 | 2.4 |
| 8 | 2.0 | 2.5 | $10^{-5}$ | 800 | 2000 | 4000 | 8,000 | 1600 | 5.0 | 7200 | 4600 | 1.6 |

EXAMPLE 14

By procedures analogous to that described in Example 1, a series of different polymeric films were exposed to low energy electron beam treatment using the apparatus of FIG. 1 and the circuitry of either FIG. 1 (DC only) or FIG. 6 (DC plus AC). The MRC gun was used as the source of electrons. The filament to sample distance was 4½ inches. Tables XV, XVI, and XVII, below, display the experimental conditions used and the polymers tested. Specific descriptions of the polymers are as follows:

Polystyrene — 1.0 mil oriented film, "Trycite," from the Dow Chemical Co.;

Eastman K-1 Polycarbonate — 1 mil film cast from methylene chloride solution. This polymer, which is available from Eastman Kodak, contains the repeating unit:

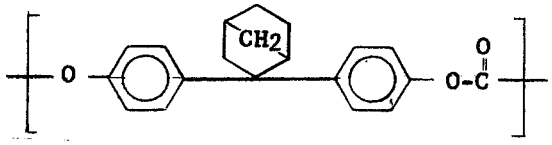

Nylon — "Capran 77C," 1-mil film, from Allied Chemical Co.

Polysulfone — 1-mil film of a polymer having the following repeating unit:

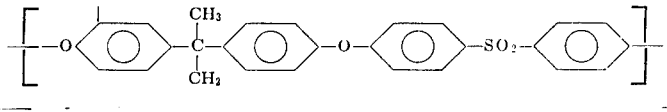

Cellulose Acetate Butyrate — 1.6 mil "Kodacel B298," from Eastman Kodak Company;

Ethyl Cellulose — 0.8 mil film, Dow Chemical Company, Type PZ .4440.4, cast from methylene chloride solution; and Cellulose acetate, 0.88 mil film of E. I. duPont Type 88CA148.

TABLE XV

Low Energy Electron Beam Treatment of Vinyl Polymers

| Polymer | Sample No. | 50 kHz. AC (kv.) | DC (kv.) | Emission (ma.) | Pressure region (torr) | Time (sec.) | Ma. (sec.) | Volt-amp (sec.) | $P_{He} \times 10^{12}$ | $P_{CH_4} \times 10^{12}$ | $\alpha He/CH_4$ |
|---|---|---|---|---|---|---|---|---|---|---|---|
| Polyethylene | 1 untreated (Four samples) | | | | | | 0 | 0 | 450–555 | 140–242 | 2.3–3.2 |
| | 2 | | 1 | 2.2 | 4 | $10^{-5}$ | 800 | 3,200 | 7,000 | 600 | 12 | 50 |
| Ethylene-vinyl acetate copolymer | 3 untreated | | | | | | 0 | 0 | 760 | 300 | 2.5 |
| | 4 | | 1 | 2.2 | 5 | $10^{-5}$ | 500 | 2,500 | 5,500 | 880 | 16 | 55 |
| Polystyrene | 5 untreated (Three samples) | | | | | | 0 | 0 | 1,600 / 1,760 / 1,600 | 36 / 21 / 40 | 44 / 73 / 40 |
| | 6 | | 0 | 1.6 | 4 | $10^{-5}$ | 200 | 800 | 1,280 | 2,000 | 12 | 166 |
| | 7 | | 0 | 1.6 | 4 | $10^{-5}$ | 400 | 1,600 | 2,560 | 2,000 | 10 | 200 |
| | 8 | | 0 | 1.7 | 4 | $10^{-5}$ | 800 | 3,200 | 5,450 | 2,000 | <2 | >1,000 |

Table XVI

Low Energy Electron Beam Treatment of Cellulose Polymers

| POLYMER | Sample No. | 50kHz AC,kV | DC kV | Emission mA | Pressure Region Torr | Time sec | EXPOSURE mA sec | Volt-amp sec |
|---|---|---|---|---|---|---|---|---|
| Cellulose Acetate | 1 untreated | — | — | — | — | — | 0 | 0 |
|  | 2 | 1 | 2.2 (two samples) | 4 | $10^{-5}$ | 800 | 3200 | 7050 |
| Ethyl Cellulose Dow PZ.4440.4 | 3 untreated | — | — | — | — | — | 0 | 0 |
|  | 4 | 0 | 1.0 | 3 | $10^{-5}$ | 500 | 1500 | 1500 |
|  | 5 | 0 | 1.0 | 3 | $10^{-5}$ | 750 | 2250 | 2250 |
|  | 6 | 0 | 1.0 (two samples) | 3.5 | $10^{-5}$ | 1500 | 5250 | 5250 |
| Cellulose Acetate Butyrate | 7 untreated | — | — | — | — | — | none | none |
|  | 8 | 0 | 3.3 | 5 | $10^{-5}$ | 500 | 2500 | 8250 |
|  | 9 | 0 | 3.3 | 10 | low $10^{-4}$ | 500 | 5000 | 16500 |
|  | 10 | 0 | 3.3 | 8 to 10 | high $10^{-5}$ to low $10^{-4}$ | 1000 | 8000 to 10,000 | 26,000 to 30,000 |

Permeability Data

| Sample No. | $P_{He} \times 10^{12}$ | $P_{CH} \times 10^{12}$ | He/CH4 | $P_O \times 10^{12}$ | $P_N \times 10^{12}$ | $O_2/N_2$ | $P_{CO} \times 10^{12}$ |
|---|---|---|---|---|---|---|---|
| 1 | 1100 | 39 | 28 |  |  |  |  |
| 2 | 1160 | 3.5 | 330 |  |  |  |  |
|  | 4030 | 755 | 5.4 |  |  |  | 4880 |
| 3 | 3960 | 500 | 7.9 | 1080 | 242 | 4.5 |  |
| 4 | 3680 | 17 | 216 | 451 | 35 | 13 | 2050 |
| 5 | 3680 | 3.5 | 1050 | 188 | 6.1 | 31 | 420 |
| 6 | 3060 | 32 | 96 | 52 | 9.9 | 5.3 | 270 |
|  | 2360 | 278 | 8.5 |  |  |  |  |
| 7 | 1920 | 288 | 6.7 |  |  |  | 4430 |
| 8* | 1670 | <10 | >167 |  |  |  | 1200 |
|  | 1280 | <6 | >200 |  |  |  |  |
| 9* (Recheck) | 1300 | 6.1 | 213 |  |  |  |  |
| 10* | 630 | 7.5 | 84 |  |  |  |  |

*Samples 8 and 10 checked, and Sample 9 rechecked, for permeability properties three months after treatment.

TABLE XVII

Electron Beam Treatment of Other Polymers

| Polymer | Sample No. | 50 kHz AC (kv.) | DC (kv.) | Emission (ma.) | Pressure region (torr) | Time (sec.) | Ma. (sec.) | Volt-amp (sec.) | Permeability constant $\times 10^{12}$ $P_{He}$ | $P_{CH_4}$ | He/CH$_4$ |
|---|---|---|---|---|---|---|---|---|---|---|---|
| Nylon | 1 untreated |  |  |  |  |  | 0 | 0 | 60 | 2 | 30 |
|  | 2 untreated |  |  |  |  |  | 0 | 0 | 79 | 3 | 26 |
|  | 3 untreated |  |  |  |  |  | 0 | 0 | 90 | 8 | 11 |
|  | 4 | 0 | 0.75 | 2 | $1.6 \times 10^{-4}$ | 800 | 1,600 | 1,200 | 71 | 1.2 | 59 |
|  | 5 | 0 | 1.0 | 4 | $1.6 \times 10^{-4}$ | 800 | 3,200 | 3,200 | 75 | <0.3 | >250 |
|  | 6 | 0 | 2.2 | 6 | $10^{-5}$ | 1,200 | 7,200 | 15,800 | 90 | <4 | >23 |
| Polysulfone | 7 untreated |  |  |  |  |  | 0 | 0 | 960 | 16 | 60 |
|  | 8 | 0 | 3.3 | 8–9 | $10^{-5}$ | 500 | 4,000–4,500 | 13,200–14,900 | 960 | 8 | 120 |
| Eastman polycarbonate type K-1. | 9 untreated |  |  |  |  |  | 0 | 0 | 1,200 | 31.5 | 38 |
|  | 10 | 1 +0 | 2.2 2.2 | ~4 4 | $10^{-5}$ $10^{-5}$ | 600 82 | 2,730 | 6,000 | 1,100 | 7.7 | 140 |

Note.—With untreated sample 9, the permeabilities were measured on a sample of uncertain thickness. The absolute values of P may therefore be erroneous, however, the ratio of $P_{He}$ to $P_{CH_4}$ is correct.

EXAMPLE 15

By procedures analogous to that described in Example 1, a series of different polymeric films were exposed to low energy electron beam treatment using the apparatus of FIG. 1 and the electrical circuitry of FIG. 1 (DC only). The MRC gun was employed as the source of electrons, and except for Sample Nos. 31 and 32, the filament to film distance was 4.5 inches. Table XVIII, below, displays the experimental conditions used, the polymeric films tested, and the results of gas permeability evaluations. Specific descriptions of the polymeric films not sufficiently identified in the table are the following:

"TEFLON FEP" — 1 mil film of poly(tetrafluoroethylenehexafluoropropylene) (permeation data on treated film obtained seven days after treatment);

Plasticized PVC — 2 mil film of plasticized polyvinyl chloride;

"Tedlar PVF" — 2 mil film of polyvinyl fluoride. Type 200 SG40 TR (duPont);

Cellulose Triacetate — 0.8 mil film; "Kodacel TA404" (Eastman Kodak);

"Korad" A and C —
Type A — 3 mil or 1.7 mil films
Type C — 2 mil film
Modified Polymethyl methacrylate (Rohm and Haas);

"TPX" — Poly(4-methylpentene-1) Grade DX 816 (Injection Molding Grade) — Pressed into film at 250°C. for 30 minutes (ICI, Ltd.);

"Kapton 50H" — 0.5 mil polyimide film (duPont);
"Aclar" Type 33C — Copolymer of chlorotrifluoroethylene (Allied Chemical Co.);
Polybutene-1 — 3.5 mil film, Mobil Chemical Company, "Surlyn" ionomer — 2 mil film of salt of ethylene-acrylic acid copolymer. Sodium is the major cation (duPont); "PPO" — 0.6 mil film cast from chloroform, a General Electric Company polyphenylene oxide based on 2,6-dimethylphenol;

"Mylar" — 0.5 mil type S polyethylene terephthalate (duPont);
Polypropylene — duPont "Clysar" type 350P 1A3, heat set, 1.0 — mil film;
"PPO" — Polystyrene blend — a 50-50 blend cast from chloroform, about 2 mils thick; and "TEFLON TFE" is polytetrafluoroethylene (duPont).

TABLE XVIII
Electron Beam Treatment of Polymeric Films

| Polymeric film | No. | DC (kv.) | Emission (ma.) | Pressure region (torr) | Time (sec.) | Ma. (sec.) | Volt-amp (sec.) | $P_{He}$ | $P_{CH_4}$ or $(P_{N_2})$ | $\alpha He/CH_4$ or $(\alpha He/N_2)$ |
|---|---|---|---|---|---|---|---|---|---|---|
| "Teflon FEP" | 1 | Untreated | | | | 0 | 0 | 5,600 | 80 | 70 |
| | 2 | 2 | 2 | $4\times10^{-5}$ | 1,200 | 2,400 | 4,800 | 5,200 | 24 | 216 |
| | | Recheck, one month later | | | | | | 5,625 | 13 | 430 |
| | 3 | 2 | 4 | $2\times10^{-5}$ | 1,200 | 4,800 | 9,600 | | Pinholes | |
| Plasticized PVC | 4 | Untreated | | | | 0 | 0 | 770 | 104 | 7.4 |
| | 5 | 2 | 4 | $1\times10^{-5}$ | 1,300 | 5,200 | 10,400 | 800 | <2 | >400 |
| | 6 | 2 | 4 | $0.5\times10^{-5}$ | 2,400 | 9,600 | 19,200 | 640 | 4 | 160 |
| Tedlar PVF | 7 | Untreated | | | | 0 | 0 | 160 | 24 | 6.6 |
| | 8 | 2 | 4 | $4\times10^{-5}$ | 800 | 3,200 | 6,400 | 80 | 5.36 | 15 |
| | 9 | 2 | 4 | $4\times10^{-5}$ | 1,400 | 5,600 | 11,200 | 120 | 8 | 15 |
| Kodacel TA404 | 10 | Untreated | | | | 0 | 0 | 1,280 | 25.6 | 50 |
| | 11 | 2 | 4 | $4\times10^{-5}$ | 1,400 | 5,600 | 11,200 | 1,150 | 6.4 | 180 |
| | 12 | 2 | 6 | $2\times10^{-5}$ | 1,400 | 8,400 | 16,800 | 1,344 | 4.8 | 280 |
| "Korad A", Roll #48 Lot 2285 1.7 mil. | 13 | Untreated three samples | | | | 0 | 0 | 1,220 | 13.6 | 90 |
| | | | | | | | | 935 | 2.13 | 440 |
| | | | | | | | | 1,342 | 4.2 | 316 |
| | 14 | 2 | 4 | $5\times10^{-5}$ | 800 | 3,200 | 6,400 | 1,160 | <0.5 | >2,300 |
| | 15 | 2 | 4 | $4\times10^{-5}$ | 1,400 | 5,600 | 11,200 | 1,160 | <0.5 | >2,300 |
| "Korad A" 3 mil. | 16 | Untreated | | | | 0 | 0 | 1,200 | 6 | 200 |
| | 17 | 2 | 4 | $2\times10^{-5}$ | 300 | 1,200 | 2,400 | 1,333 | 1.5 | 890 |
| "Korad C" 2 mil. | 18 | Untreated | | | | 0 | 0 | 1,280 | 16 | 80 |
| | 19 | 2 | 4 | $1\times10^{-5}$ | 600 | 2,400 | 4,800 | 1,010 | 6.5 | 155 |
| "TPX" poly(4-methylpentene-1) pressed plaque 20–22, 1 mil. | 20 | Untreated | | | | 0 | 0 | 5,000 | 900($N_2$) | 5.5($N_2$) |
| | 21 | 2 | 4 | $4\times10^{-5}$ | 800 | 3,200 | 6,400 | 5,000 | 800($N_2$) | 6.3($N_2$) |
| | | (2 is treated 20) | 4 | | | | | | 625 | 8 |
| | 22 | 2 | 4 | $6\times10^{-5}$ | 800 | 6,400 | 12,800 | | Pinholed | |
| | | (22 is treated 21.) | | | | | | | | |
| 23–26, 1.5 mil. | 23 | 2 | 4 | $1.5\times10^{-5}$ | 1,200 | 4,800 | 9,600 | 6,100 | 92($N_2$) | 66($N_2$) |
| | 24 | Recheck next day, no further treatment | | | | | | 8,000 | 1,630($N_2$) | 4.9($N_2$) |
| | | | | | | | | | 1,500 | 5.4 |
| | 25 | 2 | 4 | $2\times10^{-5}$ | 600 | 4,800 | 4,600 | 6,620 | 610($N_2$) | 10.9($N_2$) |
| | | (25 is treated 24) | | | | | | | 1,000 | 6.6 |
| | 26 | Recheck next day | | | | | | 6,800 | 490($N_2$) | 13.8($N_2$) |
| | | | | | | | | | 1,000 | 6.8 |
| 27–29, 1.3 mil. | 27 | 2 | 4 | $3\times10^{-5}$ | 700 | 2,800 | 5,600 | | Pinholes | |
| | 28 | 2 | 4 | $3\times10^{-5}$ | 900 | 3,600 | 7,200 | 3,500 | 68($N_2$) | 52($N_2$) |
| | 29 | Recheck | | | | | | 3,200 | 32.5($N_2$) | 98($N_2$) |
| "Kapton 50H" .5 mil | 30 | Untreated | | | | 0 | 0 | 460 | 175 | 2.6 |
| | 31 | 2 | 4 | $2\times10^{-5}$ | 1,400 | 5,600 | 11,200 | 150 | 1 | 150 |
| Both 534" fil. to sample | 32 | 2 | 6 | $1\times10^{-5}$ | 2,060 | 12,400 | 24,800 | 130 | <1 | >130 |
| | | Plus 2 | 7.5 | $1.5\times10^{-5}$ | 340 | 2,500 | 5,100 | | | |
| "Aclar" Type 33C 1 mil | 33 | Untreated | | | | 0 | 0 | 680 | 4 | 170 |
| | 34 | 2 | 4 | $4\times10^{-5}$ | 800 | 3,200 | 6,400 | 720 | <1 | >720 |
| | 35 | 2 | 4 | $3\times10^{-5}$ | 1,200 | 4,800 | 9,600 | 720 | 4 | 180 |
| Polybutene-1 | 36 | Untreated | | | | 0 | 0 | 320 | 48 | 6.6 |
| | 37 | 2 | 4 | $1\times10^{-5}$ | 800 | 3,200 | 6,400 | 500 | 14 | 36 |
| | 38 | 2 | 2 | $0.8\times10^{-5}$ | 1,200 | 2,400 | 4,800 | 380 | <2 | >190 |
| Surlyn Ionomer 2 mil. | 39 | Untreated | | | | 0 | 0 | 780 | 9 $N_2$ | 87 $N_2$ |
| Type 1601 | 40 | 2 | 4 | $6\times10^{-5}$ | 800 | 3,200 | 6,400 | 837 | 15 $N_2$ | 56 $N_2$ |
| | 41 | 2 | 4 | $2\times10^{-5}$ | 1,400 | 5,600 | 11,200 | 800 | 8 | 100 |
| | 42 | 2 | 6 | $2\times10^{-5}$ | 1,400 | 8,400 | 16,800 | 800 | <4 | >200 |
| Ethylene-acrylic acid Copolymer 0.5 mil. 12.6% AA, 4.3 M.I. | 43 | Untreated | | | | 0 | 0 | 625 | 110 | 5.7 |
| | | | | | | | | 776 $CO_2$, | $CO_2/CH_4=7$ | |
| | 44 | 2 | 4 | $5\times10^{-5}$ | 600 | 2,400 | 4,800 | 700 | 15 | 47 |
| | 45 | 2 | 4 | $4\times10^{-5}$ | 1,000 | 4,000 | 8,000 | 720 | <0.5 | >1,400 |
| | | | | | | | | 440 $CO_2$, | $CO_2/CH_4=880$ | |
| Ethylene-vinyl acetate copolymer, 18% VA 2 M.I., 2.5 mil. | 46 | Untreated three samples | | | | 0 | 0 | 1,600 | 900 | 1.8 |
| | | | | | | | | | 6,500 $CO_2$ | |
| | | | | | | | | 1,071 | 708 | 1.5 |
| | | | | | | | | | 5,000 $CO_2$ | |
| | | | | | | | | 871 | 708 | 1.2 |
| | | | | | | | | | 6,000 $CO_2$ | |
| | 47 | 2 | 4 | $1.6\times10^{-5}$ | 1,400 | 5,600 | 11,200 | 1,600 | 500 | 3.2 |
| | 48 | 2 | 6 | $2\times10^{-5}$ | 1,500 | 9,000 | 18,000 | 1,700 | 500 | 3.4 |
| Ethylene-ethyl acrylate copolymer. | 49 | Untreated | | | | 0 | 0 | 1,030 | 700 | 1.5 |
| | | | | | | | | | 4,000 $CO_2$ | |

TABLE XVIII—Continued
Electron Beam Treatment of Polymeric Films

| Polymeric film | No. | DC (kv.) | Emission (ma.) | Pressure region (torr) | Time (sec.) | Ma. (sec.) | Volt-amp (sec.) | $P_{He}$ | $P_{CH_4}$ or ($P_{N_2}$) | $\alpha He/CH_4$ or ($\alpha He/N_2$) |
|---|---|---|---|---|---|---|---|---|---|---|
| 18% EA, 1 mil | 50 | 2 | 4 | $8 \times 10^{-6}$ | 1,200 | 4,800 | 9,600 | 1,560 | 280 | 5.5 |
| | 51 | 2 | 7 | $1 \times 10^{-5}$ | 1,200 | 8,400 | 16,800 | 2,960 | 1,600 | *1.85 |
| | 52 | 2 | 4 | $4 \times 10^{-5}$ | 600 | 2,400 | 4,800 | 1,840 | 540 | 2.9 |
| | | | | | | | | 3,480 $CO_2$, $CO_2/CH_4$=6.5 | | |
| | 53 | 2 | 7 | $4 \times 10^{-5}$ | 900 | 6,300 | 12,600 | 1,200 | 120 | 10 |
| | | | | | | | | 950 $CO_2$, $CO_2/CH_4$=7.9 | | |
| "PPO" | 54 | Untreated | | | | 0 | 0 | He 6,000, $CH_4$ 225, $\alpha$=26.7 | | |
| | | | | | | | | $O_2$ 900, $N_2$ 215, $\alpha$=4.2 | | |
| | | | | | | | | $CO_2$ 5,330 | | |
| | 55 | 0.3 | 1.0 | $1.5 \times 10^{-4}$ Ar added. | 800 | 800 | 240 | He 5,940, $CH_4$ 13.8, $\alpha$430 | | |
| | | | | | | | | $O_2$ 209, $N_2$ 14.4, $\alpha$=14.5 | | |
| | | | | | | | | $CO_2$ 800 | | |
| Polyvinyl acetate, 1.0 mil | 56 | | | | | 0 | 0 | 830 | 3.7 | 224 |
| | 57 | 2.0 | 4 | $2.5 \times 10^{-5}$ | 800 | 3,200 | 6,400 | 1,000 | 0.58 | 1,724 |
| | | | | | | | | | $1.6 \times 10^{-5}$ | |
| Polypropylene | 58 | Untreated | | | | 0 | 0 | 731 | 25.5 | 29 |
| | | | | | | | | | 324 $CO_2$ | |
| | 59 | do | | | | 0 | 0 | 417 | 31.5 | 13.5 |
| | | | | | | | | | 343 $CO_2$ | |
| #60 is treated #58 | 60 | 2 | 4 | $2 \times 10^{-5}$ | 1,000 | 4,000 | 8,000 | 423 | 9.2 | 46 |
| | | | | | | | | | 218 $CO_2$ | |
| #61 is treated #59 | 61 | 2 | 4 | $2 \times 10^{-5}$ | 1,000 | 4,000 | 8,000 | 638 | 17.5 | 36.7 |
| | | | | | | | | | 141 $CO_2$ | |
| "Mylar," 0.5 mil Type S | 62 | Untreated | | | | 0 | 0 | 79 | 2.98 | 26 |
| #63 is treated #62 | 63 | 2 | 4 | $2 \times 10^{-5}$ | 1,000 | 4,000 | 8,000 | 75 | 0.85 | 88 |
| | 64 | Untreated | | | | 0 | 0 | 132 | 2.3 | 57 |
| #65 is treated #64 | 65 | 2 | 4 | $2 \times 10^{-5}$ | 800 | 3,200 | 6,400 | 83 | 0.90 | 92 |
| "Teflon TFE" 2.5-3 mil | 66 | Untreated (two samples) | | | | 0 | 0 | 5,640 | 144 | 39 |
| | | | | | | | 0 | 5,630 | 141 | 40 |
| | 67 | 1 | 2 | $10^{-5}$ | 1,600 | 3,200 | 3,200 | 5,400 | 168 | 32 |
| | 68 | 1 | 4 | $10^{-5}$ | Melted | | | | | |
| | 69 | 2.2 | 10 | $10^{-3}$–$10^{-4}$ | do | | | | | |
| | 70 | 1 | 5 | $10^{-4}$ | do | | | | | |
| | 71 | 2 | 2 | $1$–$2 \times 10^{-5}$ | 2,500 | 5,000 | 10,000 | 5,520 | 84 | 66 |
| | 72 | 2 | 4 | $0.6 \times 10^{-5}$ | 2,500 | 10,000 | 20,000 | 4,320 | 120 | 36 |
| | 73 | 0.5 | 1 | $5 \times 10^{-4}$ Ar added. | 1,200 | 1,200 | 600 | 3,600 | 20 | 180 |
| | 74 | 0.5 | 1 | $1.5 \times 10^{-4}$ Ar added. | 1,200 | 1,200 | 600 | 4,140 | 36 | 115 |
| | (72 checked 6 days after treatment) | | | | | | | | | |
| | (73 and 74 checked one day after treatment) | | | | | | | | | |
| "PPO"—Polystyrene blend | 75 | Untreated | | | | 0 | 0 | 2,730 | 86 | 32 |
| | | | | | | | | | 2,400 $CO_2$ | |
| | 76 | 0.5 | 1 | $2 \times 10^{-5}$ | 200 | 200 | 100 | 1,600 | 33 | 48 |
| | | | | | | | | | 800 $CO_2$ | |
| Polydimethylsiloxane rubber 1 mil. | 77 | Untreated | | | | 0 | 0 | 17,600 | 43,500 | .40 |
| | | | | | | | | $CO_2$174,000; | | .25 |
| | | | | | | | | $CO_2/CH_4$ | | |
| General Electric | 78 | .25 | 1.0 | $3 \times 10^{-4}$ | 800 | 800 | 200 | 16,650 | 10,760 | 1.54 |
| | | | | | | | | $CO_2$50,000; | | 4.64 |
| | | | | | | | | $CO_2/CH_4$ | | |
| Estane 5710 polyurethane | 79 | Untreated (2 mil) | | | | 0 | 0 | 400 | 50 | 8 |
| | | | | | | | | $CO_2$900; $CO_2/CH_4$ | | 20 |
| | 80 | (1 mil) 1 kv | 4.2 | $3 \times 10^{-4}$ | 1,000 | 4,200 | 4,200 | 360 | 12.3 | 29 |
| | | | | | | | | $CO_2$530; $CO_2/CH_4$ | | 43 |

*Possible pinhole.

What is claimed is:

1. Process which comprises exposing an organic polymeric film to a beam of low energy electrons at a potential from about 10 to about 30,000 volts, and under an absolute pressure below the pressure at which glow discharge occurs and below about $5 \times 10^{-3}$ torr, the total exposure of said polymeric film to said beam of electrons being within the range of from about 0.0005 to about 1,000 volt-ampere-seconds per square centimeter and sufficient to lower the permeability of said polymeric film with respect to at least one gas.

2. The process of claim 1 wherein the total exposure of said polymeric film to said beam of electrons is sufficient to increase the permeation separation selectivity towards at least one gas.

3. The process of claim 1 wherein the total exposure of said polymeric film to said beam of electrons is sufficient to increase the barrier properties of said polymeric film with respect to at least one gas.

4. The process of claim 1 wherein said potential is within the range of from about 10 to about 3,000 volts.

5. The process of claim 1 wherein said pressure is above about $10^{-7}$ torr.

6. The process of claim 1 wherein said pressure is within the range of from about $10^{-5}$ torr to about $3 \times 10^{-3}$ torr.

7. The process of claim 1 wherein the total exposure of said polymeric film to said beam of electrons is within the range of from about 0.005 to about 1,000 volt-ampere-seconds per square centimeter.

8. The process of claim 7 wherein said total exposure is above about 0.05 volt-ampere-seconds per square centimeter.

9. The process of claim 1 wherein the rate of exposure of said polymeric film to said beam of electrons is within the range of from about 0.0002 to about 3 volt-amperes per square centimeter.

10. The process of claim 1 wherein the said polymeric film is exposed to said beam of electrons at a rate within the range of from about 0.0005 to about 20 milliamperes per square centimeter.

11. The process of claim 1 wherein said potential is within the range of from about 10 to about 3,000 volts, wherein said pressure is within the range of from about $10^{-5}$ to about $3 \times 10^{-3}$ torr, wherein the total exposure of said polymeric film to said beam of electrons is within the range of from about 0.0005 to about 1,000 volt-ampere-seconds per square centimeter, and wherein said polymeric film has a thickness of up to about 10 mils.

12. The process of claim 11 wherein the rate of exposure of said polymeric film to said beam of electrons is within the range of from about 0.0002 to about 3 volt-amperes per square centimeter.

13. The process of claim 1 wherein said polymeric film is a film of a polymer of an olefinically unsaturated monomer.

14. The process of claim 4 wherein said polymeric film is a film of a polymer of an olefinically unsaturated monomer.

15. The process of claim 6 wherein said polymeric film is a film of a polymer of an olefinically saturated monomer.

16. The process of claim 7 wherein said polymeric film is a film of a polymer of an olefinically unsaturated monomer.

17. The process of claim 12 wherein said polymeric film is a film of a polymer of an olefinically unsaturated monomer.

18. The process of claim 1 wherein said polymeric film is a film of a cellulosic polymer.

19. The process of claim 4 wherein said polymeric film is a film of a cellulosic polymer.

20. The process of claim 6 wherein said polymeric film is a film of a cellulosic polymer.

21. The process of claim 7 wherein said polymeric film is a film of a cellulosic polymer.

22. The process of claim 12 wherein said polymeric film is a film of a cellulosic polymer.

23. The process of claim 22 wherein the cellulosic polymer is cellulose acetate.

24. The process of claim 1 wherein said polymeric film is a film of a polycarbonate.

25. The process of claim 4 wherein said polymeric film is a film of a polycarbonate.

26. The process of claim 6 wherein said polymeric film is a film of a polycarbonate.

27. The process of claim 7 wherein said polymeric film is a film of a polycarbonate.

28. The process of claim 12 wherein said polymeric film is a film of a polycarbonate.

29. The process of claim 28 wherein said polycarbonate is a polycarbonate of a bisphenolalkane.

30. The process of claim 29 wherein said bisphenol alkane is 2,2-bisphenolpropane.

31. The process of claim 28 wherein said polycarbonate is a polycarbonate of 2,2,4,4-tetramethyl-1,3-butanediol.

32. The process of claim 1 wherein said polymeric film is an asymmetric film.

33. The process of claim 12 wherein said polymeric film is an asymmetric film.

34. The process of claim 23 wherein the cellulose acetate film is asymmetric.

35. The process of claim 1 wherein said polymeric film is a film of a siloxane polymer.

36. The process of claim 12 wherein the polymeric film is a film of a siloxane polymer.

37. The process of claim 1 wherein the polymeric film is a film of a polyphenylene oxide.

38. The process of claim 12 wherein said polymeric film is a film of a polyphenylene oxide.

39. Apparatus for exposing an organic polymeric film to a beam of low energy electrons which comprises in combination:
 a. a source of low energy electrons having a potential from about 10 to about 30,000 volts;
 b. a target to receive said low energy electrons;
 c. electrical circuit means to impel said electrons between said source and said target along a predetermined path;
 d. means for inserting an organic polymeric film in said path; and
 e. means for containing said source, target, path, and polymeric film under an absolute pressure below the pressure at which glow discharge occurs and below about $5 \times 10^{-3}$ torr.

40. The apparatus of claim 39 wherein said target to receive electrons comprises an electrically conductive member capable of supporting said polymeric film at a position in said path.

41. The apparatus of claim 40 wherein said electrically conductive member comprises a rotatably mounted member adapted to continuously move said polymeric film through said path.

42. The apparatus of claim 40 wherein the electrical circuit means includes means for inducing a positive potential on said electrically conductive member and a negative potential on said source of electrons.

43. The apparatus of claim 42 wherein said source of electrons comprises a heated filament.

* * * * *